(12) United States Patent
Scheffer et al.

(10) Patent No.: US 12,470,649 B2
(45) Date of Patent: *Nov. 11, 2025

(54) SELF-ORGANIZING COMMUNICATIONS NETWORK NODES AND SYSTEMS

(71) Applicant: Vorbeck Materials Corp., Jessup, MD (US)

(72) Inventors: Dan F. Scheffer, Frederick, MD (US); Sriram Manivannan, Baltimore, MD (US); Keren Espina, Randallstown, MD (US); Jennifer Pinkos, Hanover, MD (US); Can Gun Yaprak, Halethorpe, MD (US); Alison Baskerville, Reisterstown, MD (US)

(73) Assignee: Vorbeck Materials Corp., Jessup, MD (US)

( * ) Notice: Subject to any disclaimer, the term of this patent is extended or adjusted under 35 U.S.C. 154(b) by 364 days.

This patent is subject to a terminal disclaimer.

(21) Appl. No.: 18/199,829

(22) Filed: May 19, 2023

(65) Prior Publication Data
US 2023/0362289 A1 Nov. 9, 2023

Related U.S. Application Data

(63) Continuation of application No. 17/559,650, filed on Dec. 22, 2021, now Pat. No. 11,729,304, which is a
(Continued)

(51) Int. Cl.
*H04M 1/05* (2006.01)
*A41D 1/00* (2018.01)
(Continued)

(52) U.S. Cl.
CPC .............. *H04M 1/05* (2013.01); *A41D 1/002* (2013.01); *A41D 31/08* (2019.02); *H01Q 1/273* (2013.01);
(Continued)

(58) Field of Classification Search
CPC .......... H04M 1/05; H04M 1/04; A41D 1/002; A41D 31/08; H01Q 1/273; H01Q 1/368;
(Continued)

(56) References Cited

U.S. PATENT DOCUMENTS

| 8,341,762 B2 * | 1/2013 | Balzano | A41D 31/245 |
| | | | 2/2.5 |
| 9,058,733 B2 * | 6/2015 | Brinkley | G08B 25/016 |

(Continued)

FOREIGN PATENT DOCUMENTS

| CN | 106371508 A * | 2/2017 | ............. G06F 1/163 |
| WO | WO-03065601 A1 * | 8/2003 | ........... A45C 11/002 |

(Continued)

*Primary Examiner* — Mahendra R Patel
(74) *Attorney, Agent, or Firm* — Woods Oviatt Gilman LLP; Trent V. Bolar, Esq.

(57) ABSTRACT

A communications node includes an apparel item in the form of a backpack attachment that includes a panel, first and second arms extending therefrom. An antenna element and A/V hub may be affixed to an arm. The attachment may include a communications device and battery. A control circuit may be communicatively coupled to the antenna element, the A/V hub, the communications device, and the battery. The A/V hub may demountably and communicatively couple to an audio/video source. The control circuit may establish a mesh network with computing devices. The antenna element may include a graphene polymer conductive composition. The graphene may form a three-dimensional percolated network within the polymer matrix. The apparel item may include a multilayered material that reflect RF radiation generated by the antenna element away from the apparel item. The layer may include a conductive material. The layer may include a foam.

19 Claims, 22 Drawing Sheets

Related U.S. Application Data continuation of application No. 16/925,561, filed on Jul. 10, 2020, now Pat. No. 11,245,784.

(60) Provisional application No. 63/013,599, filed on Apr. 22, 2020, provisional application No. 62/960,098, filed on Jan. 12, 2020, provisional application No. 62/957,421, filed on Jan. 6, 2020.

(51) Int. Cl.
| | | |
|---|---|---|
| *A41D 31/08* | (2019.01) | |
| *H01Q 1/27* | (2006.01) | |
| *H01Q 1/36* | (2006.01) | |
| *H04B 1/3827* | (2015.01) | |
| *H04W 84/04* | (2009.01) | |
| *H04W 84/18* | (2009.01) | |

(52) U.S. Cl.
CPC .............. *H01Q 1/368* (2013.01); *H04B 1/385* (2013.01); *H04B 2001/3855* (2013.01); *H04W 84/04* (2013.01); *H04W 84/18* (2013.01)

(58) Field of Classification Search
CPC . H01Q 1/38; H01Q 9/28; H04B 1/385; H04B 2001/3855; H04W 84/04; H04W 84/18; H04W 84/12
USPC ...................................................... 455/575.6
See application file for complete search history.

(56) References Cited

U.S. PATENT DOCUMENTS

| | | | | |
|---|---|---|---|---|
| 10,269,234 | B2 * | 4/2019 | Wengrovitz | H04M 1/72412 |
| 11,422,507 | B2 * | 8/2022 | Wang | G04B 37/005 |
| 11,614,716 | B2 * | 3/2023 | Liang | H04R 1/04 368/10 |
| 11,766,186 | B2 * | 9/2023 | Mantrawadi | A45F 5/00 600/479 |
| 2002/0145849 | A1 * | 10/2002 | Peterson, III | G06F 1/163 361/679.03 |
| 2006/0132382 | A1 * | 6/2006 | Jannard | G02C 11/06 345/8 |
| 2014/0120839 | A1 * | 5/2014 | Lam | A41D 1/005 455/41.2 |
| 2014/0139422 | A1 * | 5/2014 | Mistry | G06F 3/014 345/156 |
| 2016/0058375 | A1 * | 3/2016 | Rothkopf | G04G 21/025 600/323 |
| 2017/0116846 | A1 * | 4/2017 | Wengrovitz | H04M 1/72412 |
| 2017/0164092 | A1 * | 6/2017 | Baek | H04M 1/0241 |
| 2017/0223160 | A1 * | 8/2017 | Duddy | H01Q 1/273 |
| 2017/0274249 | A1 * | 9/2017 | Moebius | A63B 23/0405 |
| 2018/0062249 | A1 * | 3/2018 | Sung | H01Q 5/364 |
| 2019/0133303 | A1 * | 5/2019 | Thiel | A41D 27/201 |
| 2019/0268550 | A1 * | 8/2019 | Arnold | A42B 3/042 |

FOREIGN PATENT DOCUMENTS

| | | | | |
|---|---|---|---|---|
| WO | WO-2012009335 A1 * | 1/2012 | ............ | H04B 1/385 |
| WO | WO-2018135836 A1 * | 7/2018 | ............ | H04W 48/02 |

* cited by examiner

SELF-ORGANIZING COMMUNICATIONS NETWORK NODES AND SYSTEMS

CROSS-REFERENCE TO RELATED APPLICATIONS

This application is a continuation of U.S. patent application Ser. No. 17/559,650 filed Dec. 22, 2021, which is a continuation of U.S. patent application Ser. No. 16/925,561 filed Jul. 10, 2020, which claims priority to U.S. Provisional Application No. 62/957,421 filed Jan. 6, 2020; U.S. Provisional Application No. 62/960,098 filed Jan. 12, 2020; and U.S. Provisional Application No. 63/013,599 filed Apr. 22, 2020. These applications are hereby incorporated herein by reference.

FIELD OF THE INVENTION

The present invention relates generally to communications networks and specifically to self-organizing communications network nodes and systems.

BACKGROUND

Data communication networks may include various, hubs, switches, routers, and other network devices, interconnected and configured to handle data as it passes through the network. These devices will be referred to herein as "network elements." Data is communicated through the data communication network by passing data packets (or cells, frames, or segments) between the network elements by utilizing one or more communication links. A particular packet may be handled by multiple network elements and cross multiple communication links as it travels between its source and its destination over the network. Links may be formed over physical structures, such as copper cables and optical fibers, or over wireless links formed using infra-red transmissions or transmissions in a portion of the electromagnetic spectrum.

Network elements can be used to form a wireless mesh network. One characteristic of a mesh network is that in a mesh network there are generally multiple paths through the network that a given user may employ to reach the access point. By allowing traffic to hop from user to user, instead of requiring wireless transmission to take place directly between the user and an access point, it is possible to provide enhanced signal quality to users, especially where the signal may be impeded due to obstacles and other naturally occurring signal impediments. In a mesh network, an access point serves as a connection between the mesh network and a higher bandwidth communication resource, and relay points in the mesh network handle traffic for themselves and for neighboring users.

One example of a mesh network is an 802.11b access mesh. If a set of users in close geographical proximity are equipped with 802.11b cards, they can communicate with other users in a series of hops until reaching an access point of the mesh network. Typically, the access point is connected to a fixed network using a point-to-point link such as an optical fiber, copper loop, or via another wireless transmission. Due to latency and system complexity the number of wireless router hops is typically kept to some maximum, for example six. This limits the area of coverage of a wireless mesh network to a "cluster" or neighborhood community, the clusters being connected to the fixed network via the access points. Additional access points may be added to reduce the number of hops between users and access points, and hence to reduce latency and an amount of occupied bandwidth on the mesh.

An example of a conventional arrangement of wireless meshes is shown in FIG. 1. Another example of a wireless mesh network is given in U.S. Patent application publication no. US 2002/0159409 A1, the content of which is hereby incorporated herein by reference. In the example illustrated in FIG. 1, a number of different mesh networks 10 are shown, each of which may be on the scale of a neighborhood. Each mesh network 10 has a number of relay points 1 connected together and configured to handle traffic on the mesh. For example, each household in a neighborhood may be a relay point in the mesh network, the relay points being interconnected using 802.11b wireless links 14. It is noted that there may be further 802.11b devices communicating with a given relay point's location, such as in a Local Area Network (LAN) or Personal Area Network (PAN). These devices use the same technology as the relay point, can communicate with other relay points, and are considered part of the same mesh network.

In the example illustrated in FIG. 1, each mesh network 10 has an access point 16 connected to a higher bandwidth communication resource such as a Wide Area Network (WAN) base station 18 via a first tier backhaul link 20. The backhaul links 20 may be formed using a conventional point-to-point or point-to-multipoint wireless or wireline technology. In either instance, there is a single path from each access point 16 to the WAN base station 18. In the example shown in FIG. 1, the WAN base station 18 is connected via second tier wired or wireless backhaul link(s) 22 to further networking equipment, such as a central office 24. Due to the large number of first tier backhaul links 20, the full capacity of the first tier backhaul links may not be utilized. Indeed, depending on network architecture, the first tier backhaul links may be required to carry as little as 5% of their available capacity to prevent the call blocking ratio on the secondary backhaul link 22 from becoming onerous. This underutilization of the first tier backhaul links represents an over-provisioning in the first tier backhaul network which is necessary, given the limited geographical range of the mesh networks 10 being served by the first tier backhaul links 20.

FIGURES

DETAILED DESCRIPTION

Figure 1:
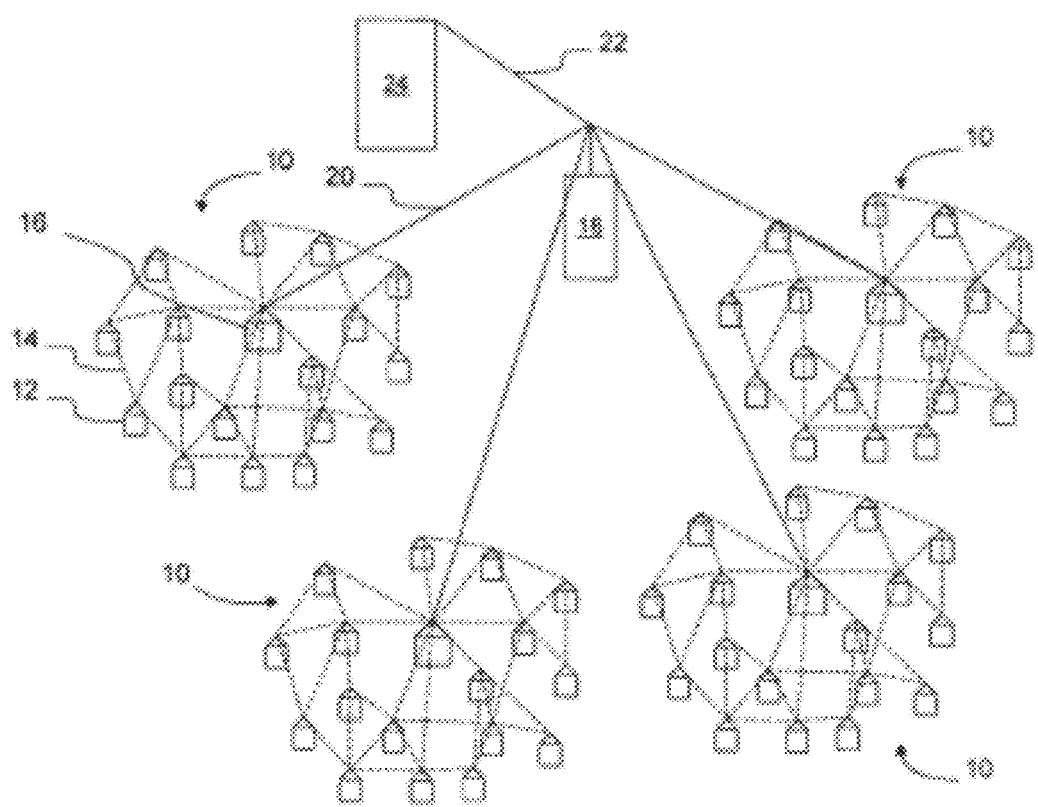
FIG. 1 is prior art that depicts a conventional arrangement of wireless mesh communications network.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Certain terminology may be employed in the following description for convenience rather than for any limiting purpose. For example, the terms "forward" and "rearward," "front" and "rear," "right" and "left," "upper" and "lower," and "top" and "bottom" designate directions in the drawings to which reference is made, with the terms "inward," "inner," "interior," or "inboard" and "outward," "outer," "exterior," or "outboard" referring, respectively, to directions toward and away from the center of the referenced element, the terms "radial" or "horizontal" and "axial" or "vertical" referring, respectively, to directions or planes which are perpendicular, in the case of radial or horizontal, or parallel, in the case of axial or vertical, to the longitudinal central axis of the referenced element, and the terms "downstream" and "upstream" referring, respectively, to directions in and opposite that of fluid flow. Terminology of similar import other than the words specifically mentioned above likewise is to be considered as being used for purposes of convenience rather than in any limiting sense.

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows. Angles may be designated as "included" as measured relative to surfaces or axes of an element and as defining a space bounded internally within such element therebetween, or otherwise without such designation as being measured relative to surfaces or axes of an element and as defining a space bounded externally by or outside of such element therebetween. Generally, the measures of the angles stated are as determined relative to a common axis, which axis may be transposed in the figures for purposes of convenience in projecting the vertex of an angle defined between the axis and a surface which otherwise does not extend to the axis. The term "axis" may refer to a line or to a transverse plane through such line as will be apparent from context. The phrases "fully exfoliated single sheets of graphene" and "fully exfoliated graphene sheets" are used interchangeably.

The present invention relates generally to communications systems and specifically to self-organizing communications nodes and systems. The instant disclosure seeks to provide a communications system of wearable mesh network capable communications nodes ("nodes").

Hand-held (i.e., portable) communications systems known in the art, such as walkie-talkies and other portable radio transceivers, are typically used by military personnel, law enforcement officials, first responders, etc. Such systems typically utilize one or more conspicuous antennas, such as whip antennas, which typically consist of a straight flexible metal wire or rod. The bottom end of whip antennas, for example, are coupled to the radio receiver, transmitter, or transceiver. Whip antennas are typically designed to be flexible to reduce breaking. In addition, individuals often also carry separate devices for data and video. For example, hazmat protection suits are personal protective equipment that consists of an impermeable whole-body garment worn as protection against hazardous materials. Hazmat suits are used by firefighters, emergency medical technicians, paramedics, researchers, personnel responding to toxic spills, specialists cleaning up contaminated facilities, and workers in toxic environments.

Such suits are often combined with self-contained breathing apparatus ("SCBA") to ensure a supply of breathable air. SCBA are devices worn by rescue workers, firefighters, and others to provide breathable air in an immediately dangerous to life or health atmosphere. The combined bulk of the whip antenna, hazmat suit, and SCBA can restrict user mobility and dexterity, which may frustrate efforts to operate in an immediately dangerous to life or health atmosphere.

Figure 2:
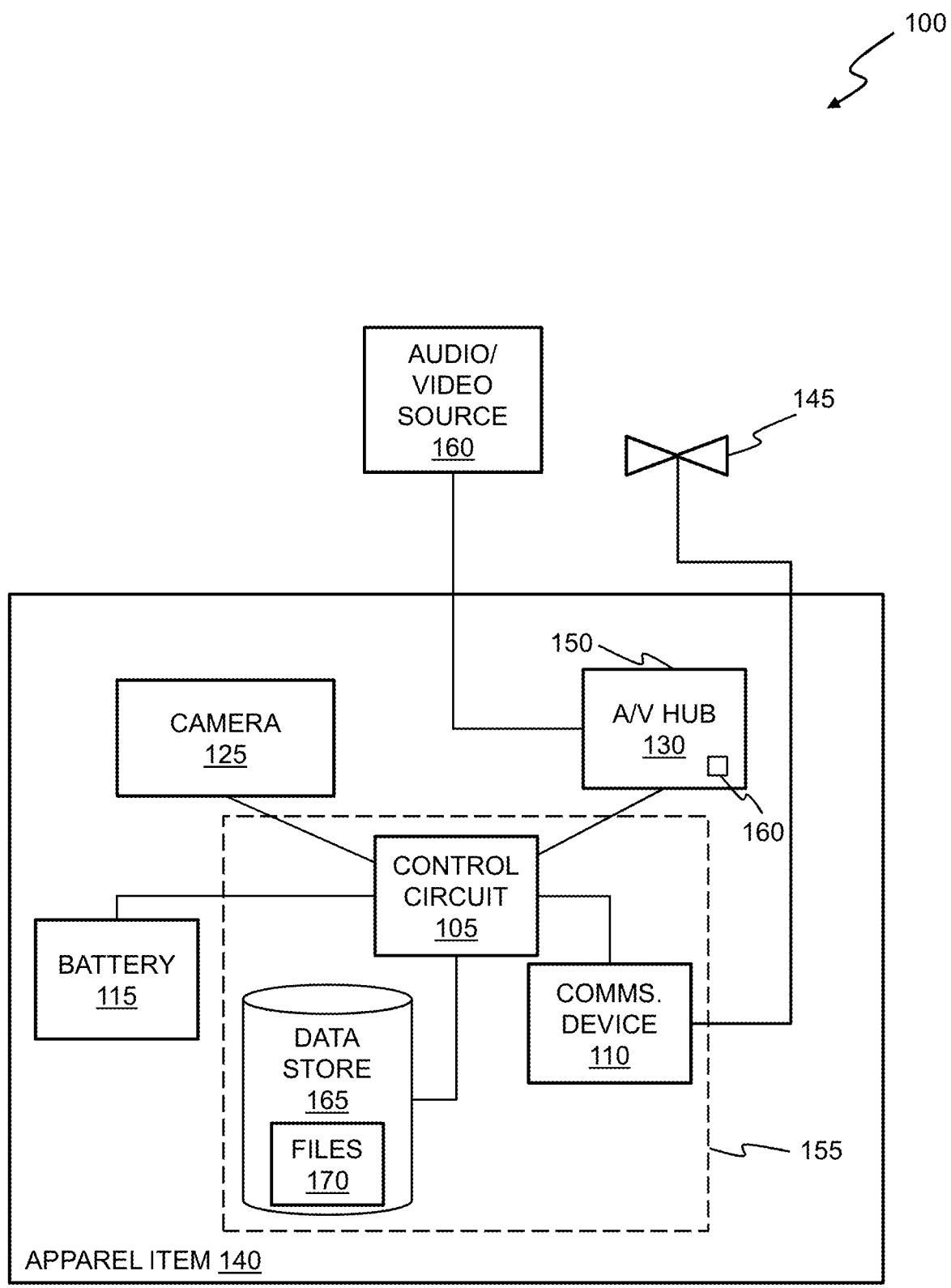
FIG. 2 depicts a block diagram of a communications node, according to some embodiments, according to some embodiments.

FIG. 2 depicts a block diagram of a communications node ("node"), in general 100, in accordance with some embodiments. The node 100, in preferred embodiments, includes one or more apparel items 140 and affixed thereon and/or therein one or more cameras 125, A/V hubs 130, communications devices 110, and battery 115 communicatively coupled to at least one control circuit 105 positioned adjacent to the apparel item 140. Apparel item 140 can be, but is not limited to, form fitting apparel items (e.g., clothing that tightly follows the contours of the part of the body being covered), undergarments (e.g., apparel items configured to be worn on the torso or lower extremities under other garments), outerwear (e.g., coats, cloaks, jackets, hoodies, pants, footwear, smocks, aprons, ponchos, and other apparel items configured to be worn on the upper and/or lower torso of a human, canine, cat, other mammals), harnesses, and other items worn on the body.

Figure 4:
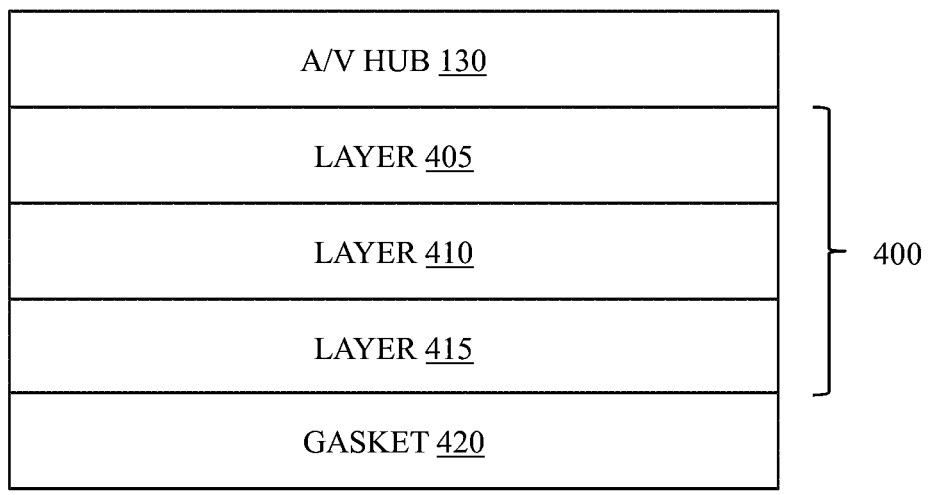
FIG. 4 depicts a side view of a portion of a multilayered material positioned adjacent to an A/V hub and a gasket, according to certain embodiments, according to certain embodiments.

The camera 125 is a device that is a device that captures regular images (e.g., using visible light), thermographic, and/or infrared images or video. The camera 125 is preferably demountably affixed external to the apparel item 140. The A/V hub 130 is a device that is affixed external to the apparel item 140 that can demountably and communicatively couple to radio communications devices and/or video feeds. The A/V hub 130 preferably includes a microphone (e.g., to allow users to communicate via radio communications devices communicatively coupled thereto) and video input connector(s), which allows captured video to be transmitted. The built in microphone of the A/V hub 130 is utilized by connecting the audio feed of their radio communications devices (not shown). The A/V hub 130 also accepts video input that can be transmitted to other nodes via the communications device 135. As depicted in FIG. 4, the apparel item 140 can be formed using a multi-layered material 400 that at least includes layers 405, 410, and 415. For example, layer 410 may be a fabric and layers 405 and 415 can be coating layers. The A/V hub 130 is preferably uses a gasket 420 to affix itself the multi-layered material 400. The A/V hub 130 is affixed to the gasket 420 via fasteners (e.g., screws) and thereby creates a hermetic seal.

In still other embodiments, the communications device 110 can include a plurality of devices interoperably connected to perform one or more functions, steps, and/or processes of communications device. The communications device 110 is a device that transmits and receives wireless information using a wireless communications protocol known in the art. The communications device 110 allows the node 100 to establish a communications network with other nodes 100. The communications device 110 can include a plurality of devices that work together to perform one or more communications tasks disclosed in the instant application.

The communications device 110 is communicatively coupled to and preferably communicates via one or more antenna elements 145 (e.g., send and/or receive data modulated via one or more communications protocols known in the art). For example, the communications device 135 can communicate via one or more communication protocols known in the art that include, but are not limited to, UHF, VHF, Long-Term Evolution ("LTE"), 3G, standards based on GSM/EDGE and/or UMTS/HSPA, Wi-Fi, IEEE 802.11 standards, General Packet Radio Service ("GPRS"), local area networking ("LAN") protocols, ("WAN") wide area networking protocols, Bluetooth®, microwave, and similar wireless communications protocols.

Figure 3:
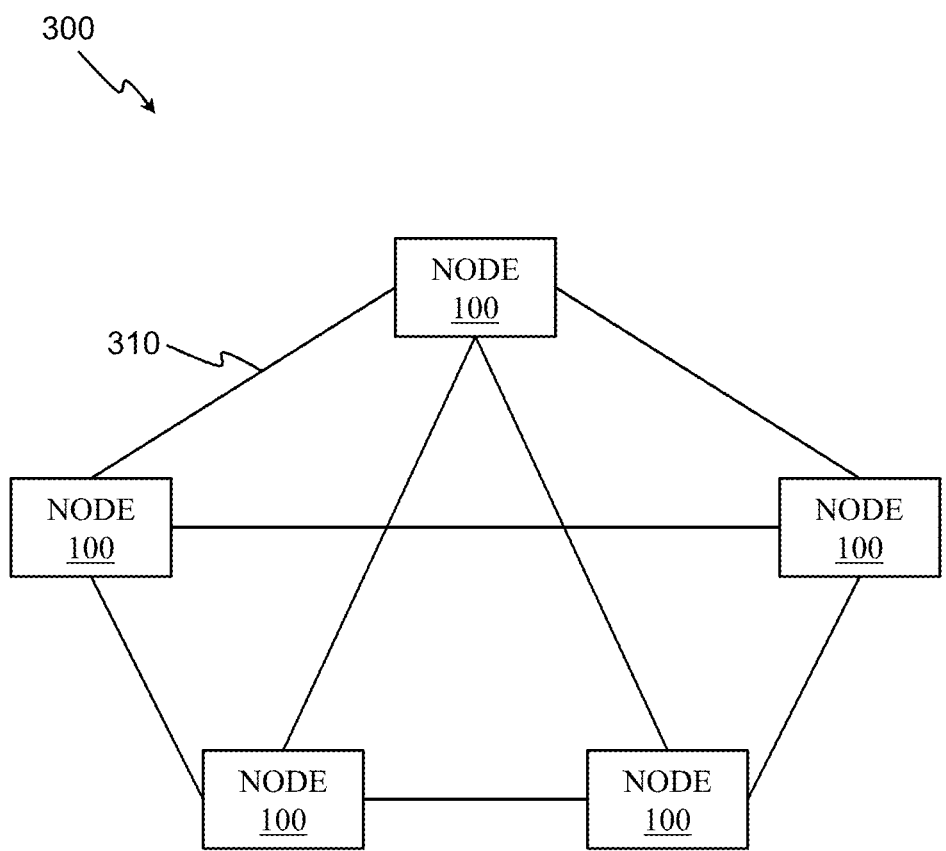
FIG. 3 depicts a block diagram of a mesh communications network, according to other embodiments, according to other embodiments.

In certain embodiments, the communications device 135 operates on several unique radio frequency ranges. For example, the communications device 135 may be configured to operate on the VHF (i.e., 30-300 MHz) and UHF (i.e., 300 MHz to 3 GHz) radio frequency bands and thereby facilitate multi-band/broadband functionality (discuss further below). The communications device 135 can preferably establish a wireless mesh network with other communications devices (e.g., nodes 100). FIG. 3 depicts a block diagram of a mesh network, generally 300, that includes nodes 100, according to some embodiments. As used herein the term "mesh network" refers to a local network topology in which the infrastructure nodes connect directly, dynamically and non-hierarchically to as many other nodes as possible and cooperate with one another to efficiently route data from/to clients.

One characteristic of a mesh network is that in a mesh network there are generally multiple paths through the network that a given user may employ to reach the access point. By allowing traffic to hop from user to user, instead of requiring wireless transmission to take place directly between the user and an access point, it is possible to provide enhanced signal quality to users, especially where the signal may be impeded due to obstacles and other naturally occurring signal impediments. In a mesh network, an access point serves as a connection between the mesh network and a higher bandwidth communication resource, and relay points in the mesh network handle traffic for themselves and for neighboring users.

Network elements can be used to form a wireless mesh network. One characteristic of a mesh network is that in a mesh network there are generally multiple paths through the network that a given user may employ to reach the access point. By allowing traffic to hop from user to user (i.e., from node to node), instead of requiring wireless transmission to take place directly between the user and an access point, it is possible to provide enhanced signal quality to users, especially where the signal may be impeded due to obstacles and other naturally occurring signal impediments. In a mesh network, an access point serves as a connection between the mesh network and a higher bandwidth communication resource, and relay points in the mesh network handle traffic for themselves and for neighboring users.

The antenna element 145 is a conductive object that transmits and receives radio waves according to preferred embodiments. The antenna element 145 are preferably planar, flexible, and bendable structures that have a reduced visual signature (e.g., less than 2 mm thick). The antenna element 145 is formed using a conductive composition that includes a polymer(s) and fully exfoliated single sheets of graphene. The fully exfoliated single sheets of graphene preferably form a three-dimensional percolated network within the polymer(s), which yields superior conductivity for the composition compared to un-percolated compositions that may rely more on the conductivity of the polymer. The fully exfoliated single sheets of graphene are separated on a nanoscale within the polymer(s). In preferred embodiments, the fully exfoliated single sheets of graphene are about 1 nm thick and substantially planar. In certain embodiments, the fully exfoliated single sheets of graphene have surface imperfection (i.e., "wrinkles" or "kinks") resulting from the presence of lattice defects in, or by chemical functionalization of the two-dimensional hexagonal lattice structure of the basal plane. Applicable polymers include, but are not limited to, polyethylene terephthalate, acrylic, rayon, aramid, modacrylic, spandex, nylon, olefin, polyester, saran, sulfur, polypropylene, polyethylene, elastane, and similar polymers.

In preferred embodiments, the fully exfoliated graphene sheets (i.e., the graphene sheets) as well as the composition are generated as disclosed in U.S. Pat. No. 7,658,901 B2 by Prud'Homme et al; U.S. Pat. No. 8,278,757 B2 by Crain; US Patent Pub. No. 2011/0189452 A1 by Lettow et al.; and US Patent Pub. No. 2014/0050903 A1 by Lettow et al., which are each hereby incorporated by reference in their entirety.

The fully exfoliated graphene sheets preferably have a surface area of about 2,630 m²/g to promote a low percolation threshold of, for example, 0.52 vol. %. To be sure, neither carbon nanotubes (e.g., SWCNT or MWCNT) nor graphite are substitutions of the aforementioned fully exfoliated graphene sheets due the different inherit structural, electrical, and mechanical properties of the materials. For example, the fully exfoliated graphene sheets have a platy (e.g., two-dimensional) structure as opposed to the three-dimensional structure of carbon nanotubes and graphite. The antenna element 145 extends up to than 2 mm from a surface of the apparel item 140. The antenna element 145 is preferably positioned under one or more layers of the apparel item 140 to further protect is from environmental conditions. The antenna elements 145 exhibit a gain greater than 0 dB.

Each antenna element 145 that is affixed to the apparel item 140 is preferably positioned at various locations and/or orientations to achieve an omnidirectional RF radiation pattern that body worn antennas known in the art (such as the radio mounted whip antenna) cannot achieve due to the RF attenuating effects of the human body. Each antenna element 145 is communicatively coupled to the communications device 110 via a transmission line 150. The transmission line 150 can be formed using the conductive composition. In some embodiments, the transmission line 150 is embedded in the apparel item 140 in a manner that reduces its ability to interfere with user movements. For example, the transmission lines 150 can be embedded between layers of the apparel item 140.

The nodes 100 disclosed herein preferably include wearable computing devices that function as communication network nodes that form mesh networks with other nodes 100. In certain embodiments, the antenna elements 145 are symmetrically affixed to the apparel item 140 to substantially achieve a 360° (i.e., omnidirectional) RF radiation pattern. In other embodiments, the antenna elements 145 can be asymmetrically affixed to the apparel item 140 to substantially achieve a directional RF radiation pattern.

FIG. 4 depicts a block diagram of the A/V hub affixed to a multilayered material, in accordance with some embodiments. The apparel item 140 is preferably made from material (e.g., the multi-layered material 400) that exhibits cut resistance, waterproofing, fire resistance, chemical resistance, optical reflectivity, and/or a combination thereof. In certain embodiments, apparel item 140 exhibits waterproofing characteristics that at least adhere to IEC standard 60529, which is hereby incorporated herein by reference; mechanical protection (i.e. cut, puncture, and abrasion resistance) characteristics that at least adhere to ANSI/ISEA 105 standards, which are hereby incorporated herein by reference; fire/flash/thermal exposure resistance characteristics at least adhering to the standards reflected in NFPA 2112, which are hereby incorporated herein by reference; chemical resistance characteristics that at least adhere to NFPA Standard 1994, which are hereby incorporated herein by reference; and/or reflective/visibility characteristics at least adhering to ANSI/ISEA 107-2015.

The mechanical characteristics of the material 400 allow the node 100 to perform in challenging environments where exposure to extreme temperatures, fire/flash/thermal exposure, chemical spills, and/or wet/water-logged environments is common. The multi-layered material 400 can be a multi-layered chemical barrier fabric that includes one or more polymer layer (e.g., the layer 405 and/or the layer 415). To reduce the probability that water, moisture, and/or chemicals leak into the interior of the apparel item 140, components, such as the A/V hub 130, are affixed to the multilayered material 400 using a gasket 420. For example, the A/V hub 130 (e.g., externally positioned) and the gasket 420 (e.g., internally positioned) can be coupled to the layer 405 and the layer 420, respectively.

The control circuit 105 (e.g., computing devices, communications devices, graphics cards, etc.) is preferably include in a housing 155. The housing 155 is preferably a rigid structure. The housing 155 is preferably made of metals and/or alloys (e.g., aluminum). In preferred embodiments, the housing 155 is filled with a thermally conductive polymer that completely surrounds the control circuit 105 therein. The housing 155 is preferably embedded in the apparel item 140 to facilitate user mobility. For example, the housing 155 is preferably positioned proximate to the user's chest area, underneath an arm, lower lumbar area, other upper torso area, or combinations thereof when the apparel item 140 is worn by the user. The housing 155 preferably includes a cover (e.g., a cover 530) that is demountably coupled to the housing 140.

According to preferred embodiments, adjacent antenna elements 145 are not positioned close enough to one another to cause RF interference (i.e., performance degradation). Adjacent antenna elements 145 are preferably positioned at least ½ wavelength apart to reduce the RF interference between them. Not to be restricted by theory, when antenna elements 145 are positioned closer than ½ wavelength it causes movement of electrons in neighboring antenna elements 145. Here, the RF signal is not inducing electron movement, but rather such movement would be influenced by the other (i.e., adjacent) antenna element 145. The electron movement caused by the neighboring antenna element 145 is termed "interference." As used herein, the term "null area" refers to a distance of up to a half wavelength from the antenna element 145 and the gain is less than −3 dBi in any particular direction.

In certain embodiments, antenna elements 145 have a gain of 1-5 dBi. For example, such RF signal characteristics are desirable since the antenna elements that have a gain of −3 dBi or less in a particular direction exhibit a reduced ability to induce interference with neighboring antennas elements. The apparel item 140 includes multilayered material 400 and one or more foam layers 410 (e.g., ¼" closed-cell polypropylene foam) positioned between the layers of the multilayered material 400. Not to be limited by theory, the foam separates the antenna element 145 from the user's body to reduce the RF attenuation caused by the user's body. For example, the foam layer can also be lined with conductive material, such as aluminum or copper foil, or material coated with graphene, silver, copper conductive ink, to provide additional RF isolation and RF shielding from the user's body to reduce the specific absorption rate (SAR). As such, the conductive material reflects RF radiation that emanates from the antenna elements 145 away from the user's body.

The edges of the apparel item 140 are preferably sealed to form a hermetic seal with components. For example, the edges of the fabric layer can be sealed on both sides (e.g., seal layers 1 and 2) using a polymer and affixed thereto. Transmission lines 150 are preferably embedded in the apparel item 140 and are preferably routed in a manner to not interfere with user's movements. In some aspects, the transmissions lines 150 are coaxial cables, wave guides, printed transmissions lines, similar conductive structures/objects, or a combination thereof. For example, the transmission lines 150 and/or the antenna elements 145 can have a radius of curvature of 0.5-3 inches to thereby allow the apparel item 140 to substantially conform to the contours of the user without a statistically significant (e.g., greater than 0.5 dB) loss in performance. In some aspects, transmission lines 150 have fire retardant properties (e.g., LMR-100A-FR, FBT-200, UL 1666, and CSA FT4).

In addition to snap connectors (female and male), the apparel item 140 may utilize other types of demountable fasteners, such as hook and loop fasteners, magnetically aligned contact pin, twist lock and screw fit connectors, snap-fit fasteners (e.g., fasteners having flexible parts, usually plastic, that demountably couple together by pushing the flexible interlocking parts together), similar demountable fasteners, or a combination of two or more thereof according to other embodiments. According to preferred embodiments, the antenna elements 145 are dipoles. In other embodiments, the antenna element 145 is a patch antenna, monopole antenna, Yagi antenna, log-periodic antenna, slot antenna, array antenna, other antenna configuration, or combinations thereof. Antenna elements 145 can be configured to operate within a one or more frequencies, including, but not limited to, HF, VHF, UHF, L, S, C, X, Ku, K, Ki, V, W, mm, A, B, C, D E, F, G H, I, J, K, L, and M.

In preferred embodiments, the antenna elements 145 are printed on polymeric material (e.g., polyethylene terephthalate ("PET")) using a graphene polymer-based composition ("conductive composition"). The conductive composition preferably includes fully exfoliated single sheets of graphene and one or more polymers. The fully exfoliated single sheets of graphene form a three-dimensional percolated network with in the polymer. Alternatively, the antenna elements 145 could also be printed using other graphene polymer-based conductive compositions that contain metals that include, but are not limited to, silver, copper, carbon, nickel, or a combination thereof. Increase in resistance results in a decrease in antenna element 145 performance efficiency. As used herein, "antenna efficiency" is defined as the ratio of power delivered to the antenna element 145 versus the power radiated therefrom. Here, an increase in electrical resistance decreases the amount of power available for radiation, which thereby decreases antenna element 145 performance efficiency. Antenna elements 145 are preferably screen printed using the conductive composition (e.g., printed on 5 mm thick PET sheets).

To be sure, 5 millimeters is the minimum thickness of PET that resists warping when exposed to the curing temperatures known in the art. In certain embodiments, the antenna element 145 has a conductivity of 0.2-1.5 Ohms/sq. Antenna elements 145 are preferably cured subsequent to printing. The antenna elements 145 can be single band or multiband.

In certain embodiments, the antenna element 145 is an antenna array. For example, use of antenna arrays provide a statistical increase in gain, directionality, and circular polarization. Such antenna arrays include a variety of antenna types, including, but not limited to, dipole antennas, patch antennas or other planar antenna element designs suitable for use in antenna arrays. Such antenna arrays preferably include a single connection that is conductively coupled to a transmission line 150 such that power input from the transmission line 150 to the antenna array is split to the individual antenna elements 145 of the array. Alternatively, such antenna arrays may be configured to include multiple connections that are conductively coupled to multiple transmission lines 145.

Several nodes 100 can together form a mesh network 300. Data communication networks may include various, hubs, switches, routers, and other network devices, interconnected and configured to handle data as it passes through the network. These devices are referred to herein as "network elements." For example, the nodes 100 are network elements. Data is communicated through the data communication network 300 by passing data packets (or cells, frames, or segments) between the network elements by utilizing one or more communication links 310. A particular packet may be handled by multiple network elements and cross multiple communication links 310 as it travels between its source and its destination over the network. Communications links 310 may be formed over physical structures, such as copper cables and optical fibers, or over wireless links formed using infra-red transmissions or transmissions in a portion of the electromagnetic spectrum.

One characteristic of a mesh network is that in a mesh network there are generally multiple paths through the network that a given user may employ to reach the access point. By allowing traffic to hop from user to user, instead of requiring wireless transmission to take place directly between the user and an access point, it is possible to provide enhanced signal quality to users, especially where the signal may be impeded due to obstacles and other naturally occurring signal impediments. In a mesh network, an access point serves as a connection between the mesh network and a higher bandwidth communication resource, and relay points in the mesh network handle traffic for themselves and for neighboring users.

In certain embodiments, the mesh network 300 is an 802.11b access mesh. When a set of users in close geographical proximity are equipped with 802.11b cards, they can communicate with other users in a series of hops until reaching an access point of the mesh network. Typically, the access point is connected to a fixed network using a point-to-point link such as an optical fiber, copper loop, or via another wireless transmission. Additional access points may be added to reduce the number of hops between users and access points, and hence to reduce latency and an amount of occupied bandwidth on the mesh.

Figure 5:
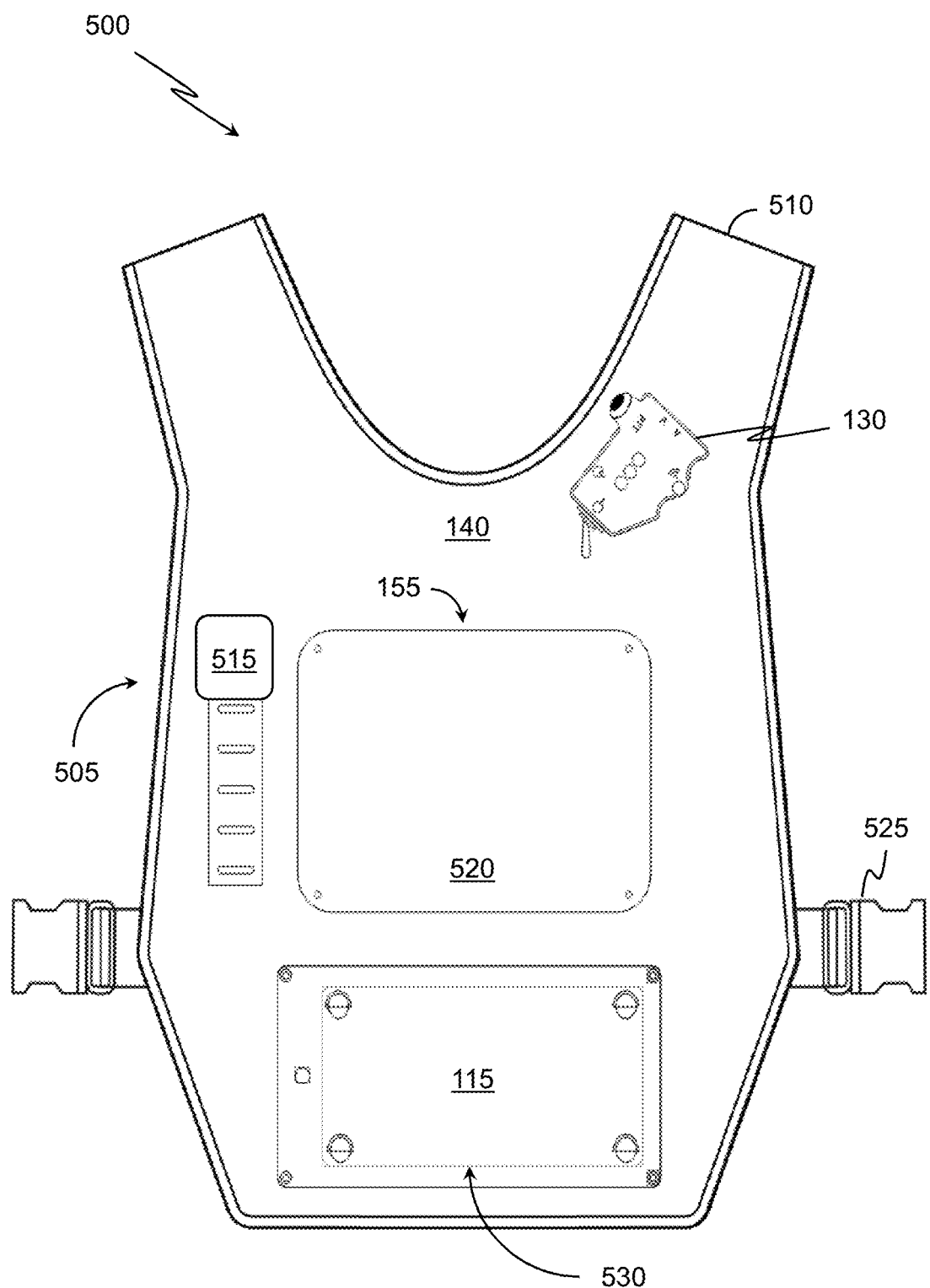
FIG. 5 depicts a front view of the communications node in the form of a harness, according to yet still others embodiments, according to yet still other.
Figure 6:
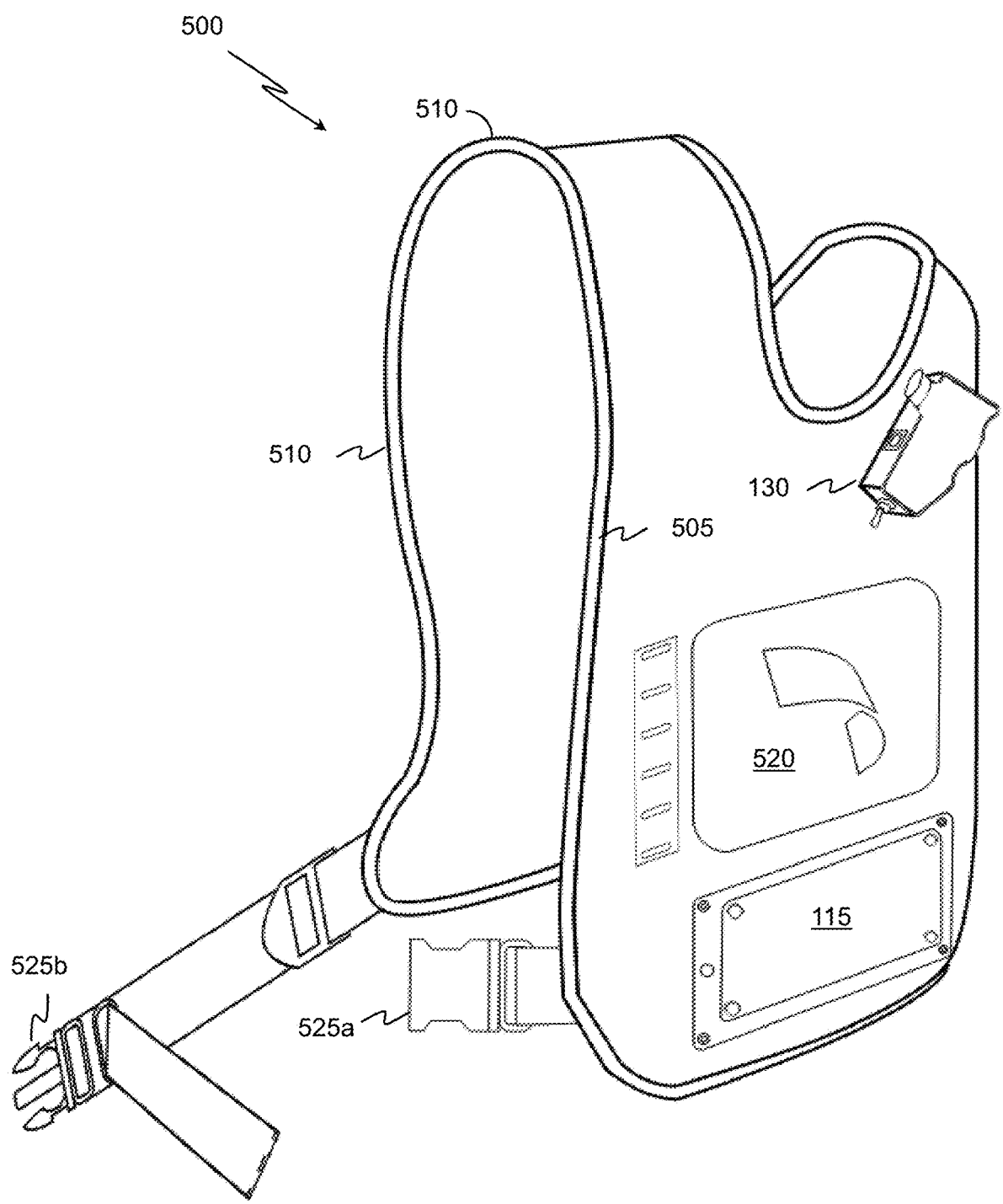
FIG. 6 depicts a perspective view of the harness, according to some embodiments, according to some embodiments.

FIG. 5-6 depict a front and perspective views of a harness, generally 500, in accordance with some embodiments. Here, the apparel item 140 is in the form of the harness 500 that includes a primary portion 505, halo element 510, fastener(s) 525, antenna element(s) 145, A/V hub 130, communications device 110, battery 115, and control circuit 105. The halo element 510 preferably extends from the primary portion 505 and is configured to be worn about a neck region of a user. The fastener(s) 525 preferably demountably couples the primary portion 505 to the halo element 510. The antenna element(s) 145 are preferably positioned within the apparel item 140. The A/V hub 130 is affixed proximate to the halo element 510 and is configured to receive audio and/or video input. The communications device 110 is preferably positioned within the apparel item 140.

The battery 115 is positioned within the apparel item 140. The control circuit 105 is positioned within the apparel item 140 and communicatively coupled to the antenna element 145, the A/V hub 130, the communications device 155, and the battery 115. The A/V hub 130 includes a microphone 160. The control circuit 105 is configured to establish, via the communications device 110, a self-organizing local area network ("LAN") with a plurality of computing devices (e.g., the communications nodes 100) each directly, dynamically, and non-hierarchically connected to the LAN. The control circuit 105 is also configured to communicate, via the communications device 155, with one or more of the computing devices using the self-organizing LAN.

The antenna elements 145 preferably include the conductive composition, which is made (i.e., includes) of fully exfoliated single sheets of graphene and at least one polymer, where the fully exfoliated single sheets of graphene form a three-dimensional percolated network within the polymer. The primary portion 505 includes a housing 155. The control circuit 105 is embedded in a thermally conductive polymer that is completely surrounded by the thermally conductive polymer. The housing 155 preferably is made of a heat conductive material and includes a cover coupled thereto. Here, the heat conductive material, which can include aluminum and/or similar material, absorbs heat generated within the housing 155 whereby the cover 520 transfer the heat to air that is external to the apparel item 140. The apparel item 140 preferably includes a National Fire Protection Association 1994 (e.g., 2018 Edition) certified material. The apparel item can include a multilayered chemical barrier fabric that includes at least one polymer layer and has an average permeation of a toxic chemical (e.g., a liquid or gas) in one hour of less than 6.0 µg/cm². In some embodiments, the battery 115 is demountably coupled to the apparel item 140. The A/V hub 130 demountably and communicatively couples to at least audio/video source 160 (e.g., handheld radio, video cameras, a computing device, a communications device, etc.).

Figure 7:
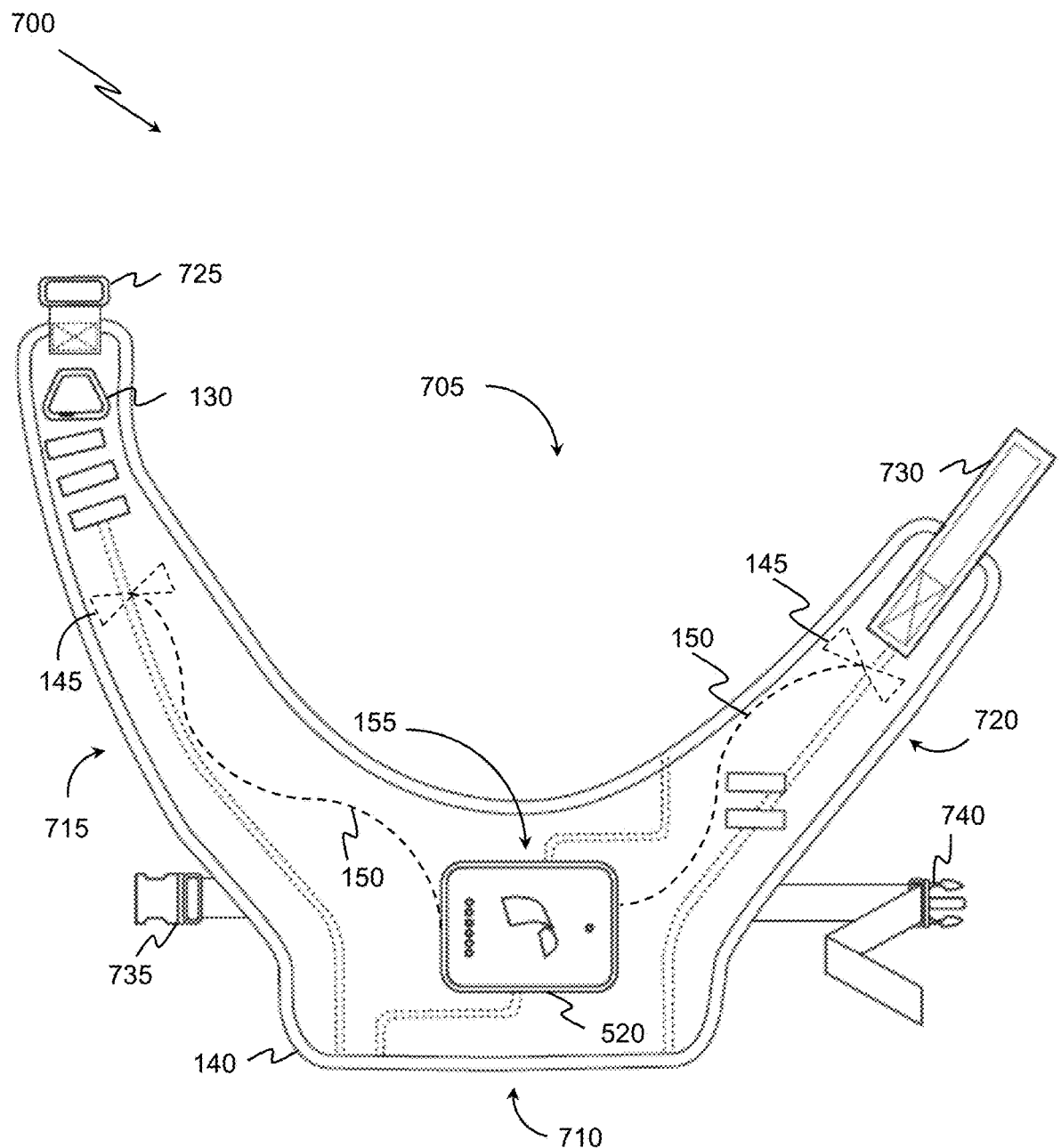
FIG. 7 depicts a front view of the communications node in the form of a shoulder belt, according to others embodiments, according to other embodiments.
Figure 8:
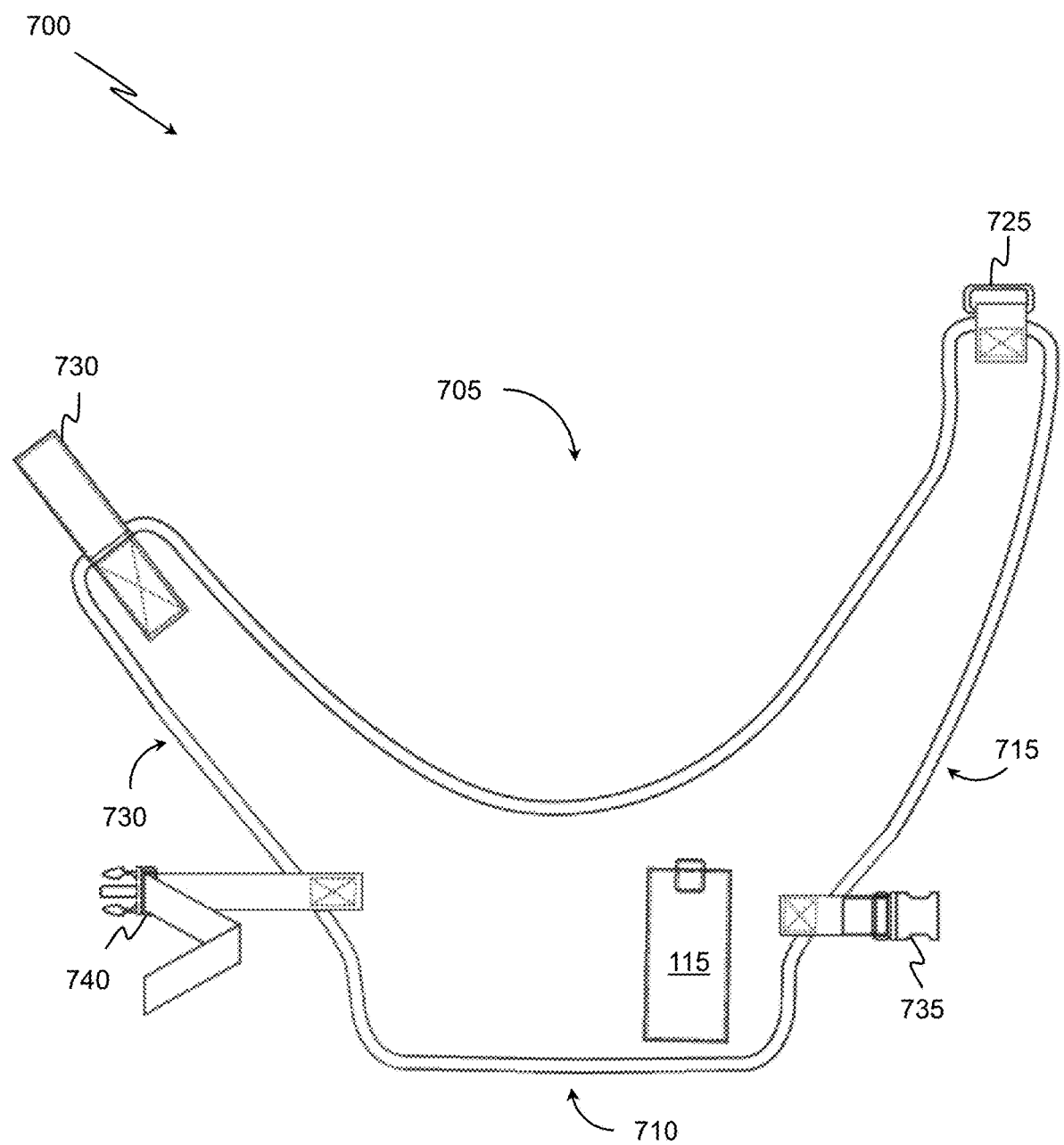
FIG. 8 depicts a back view of the shoulder belt, according to certain embodiments, according to certain embodiments.
Figure 9:
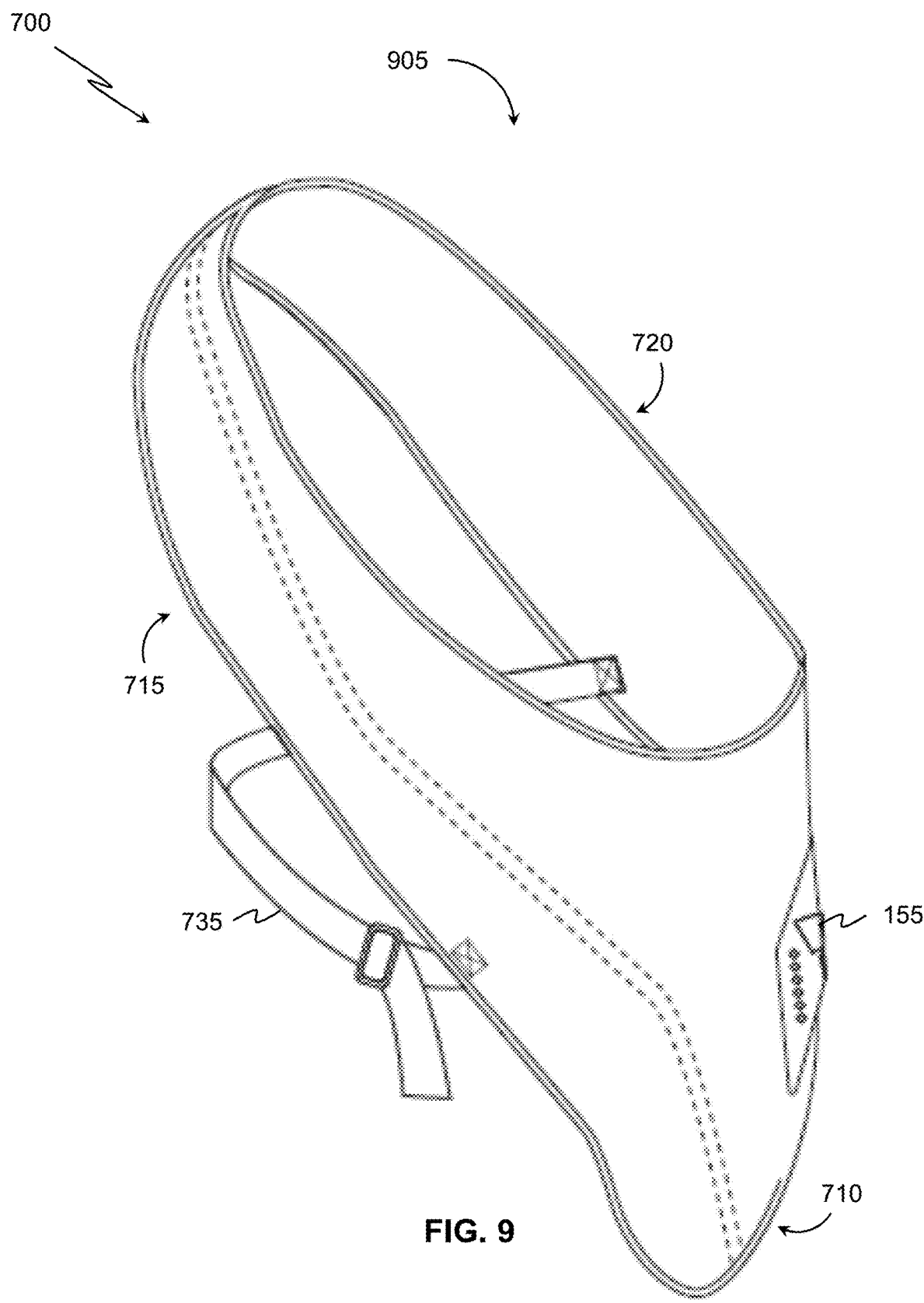
FIG. 9 depicts a front perspective view of the shoulder belt, according to yet still others embodiments, according to yet still other embodiments.
Figure 10:
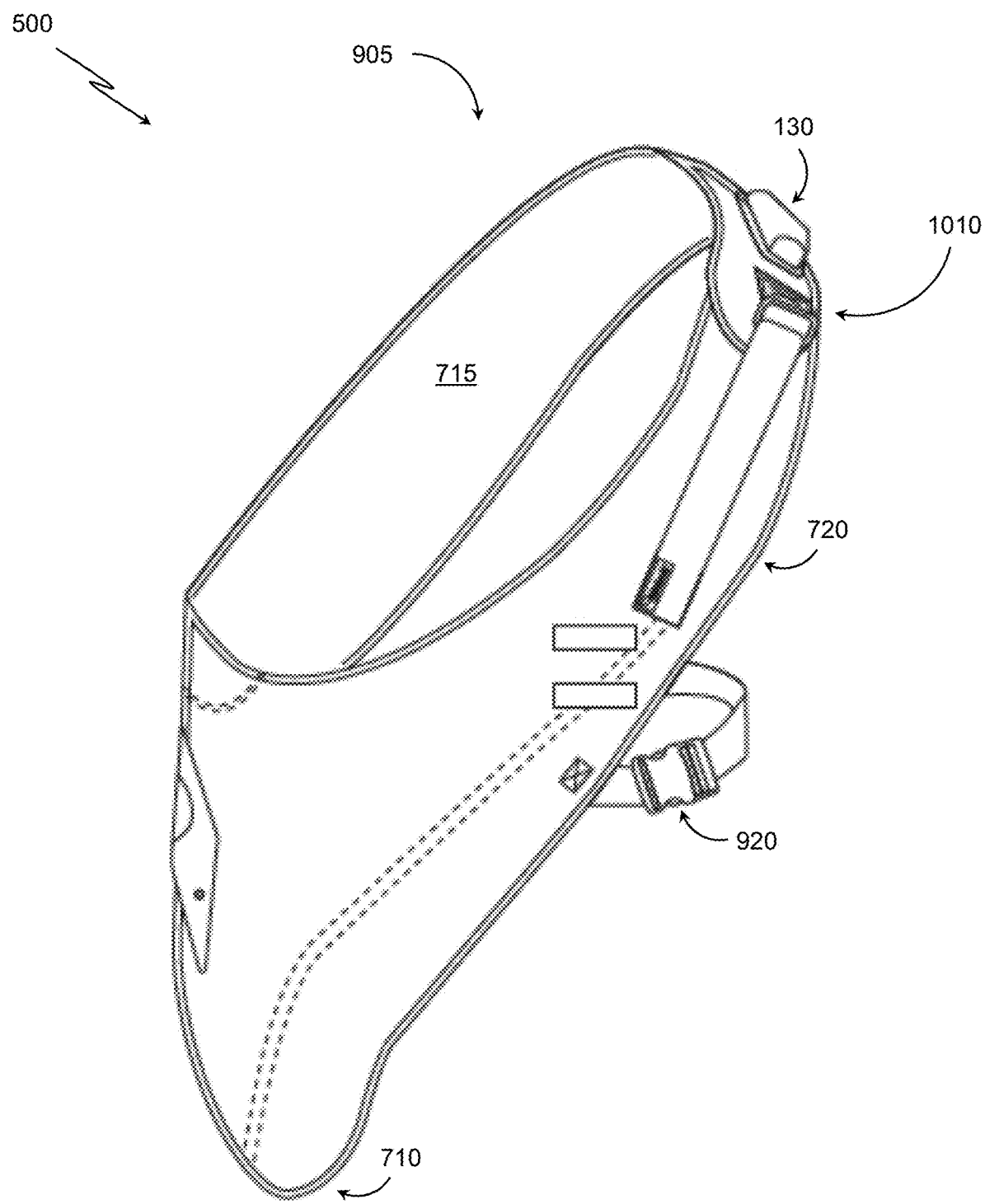
FIG. 10 depicts a back perspective view of the shoulder belt, according to some embodiments, according to some embodiments.

FIG. 7-10 depict a front, back, and perspective views of a wearable communications node 100 in the form of a shoulder belt 700, in accordance with some embodiments. FIGS. 7-8 depict the sash 700 in the open state 705 and FIGS. 9-10 depict the shoulder belt 700 in the closed state 905. Here, the apparel item 140 includes a main body 710, a first portion 715 curvingly extending from the main body 710, and a second portion angularly extending from the main body 710 opposite the first portion 715. The shoulder belt 700 has an open state 705 and a closed state 905. The primary fastener 725 demountably couples the first portion 715 and the second portion 720 together when in the closed state 905. A primary fastener 920 demountably couples the first portion 715 and the second portion 720 and thereby forms the apparel item into a shoulder belt.

The antenna element(s) 145 are preferably positioned within the apparel item 140. The A/V hub 130 is affixed proximate to the apparel item 140 and is configured to receive audio and/or video input. The communications device 110 is preferably positioned within the apparel item 140. The main body 710 includes a housing 155. The control circuit 105 can be embedded in a thermally conductive polymer. The housing 155 preferably is made of a heat conductive material and includes a cover coupled thereto. Here, the heat conductive material, which can include aluminum and/or similar material, absorbs heat generated within the housing 155 whereby the cover 520 transfer the heat to air that is external to the apparel item 140.

The first portion 715 includes a first fastener element 725 positioned opposite the main body 710. The second portion 720 comprises a second fastener element 730 is positioned opposite the main body 710. The first fastener element 725 and the second fastener element 730 demountably couple together to form the primary fastener 1010. In preferred embodiments, the first fastener element 725 is a loop and the second fastener element 730 is a hook-and-loop strap that is configured to be fed through the loop and secured to itself. The main body 710 further includes a third fastener element 735 affixed externally to the main body 710 and a fourth fastener element 740 affixed externally to the main body 710 opposite the third fastener 735.

The third fastener element 735 and the fourth fastener element 740 demountably couple together to form a secondary fastener 920 that is configured to secure the main body 710 to the user (e.g., proximate to the waist region of the user). Here, the battery 115 preferably demountably couples to the apparel item 140. In preferred embodiments, the A/V hub 130 is configured to demountably and communicatively couple to at least one audio/video source 160 (e.g., handheld radio, camera, as well as similar devices).

Figure 11:
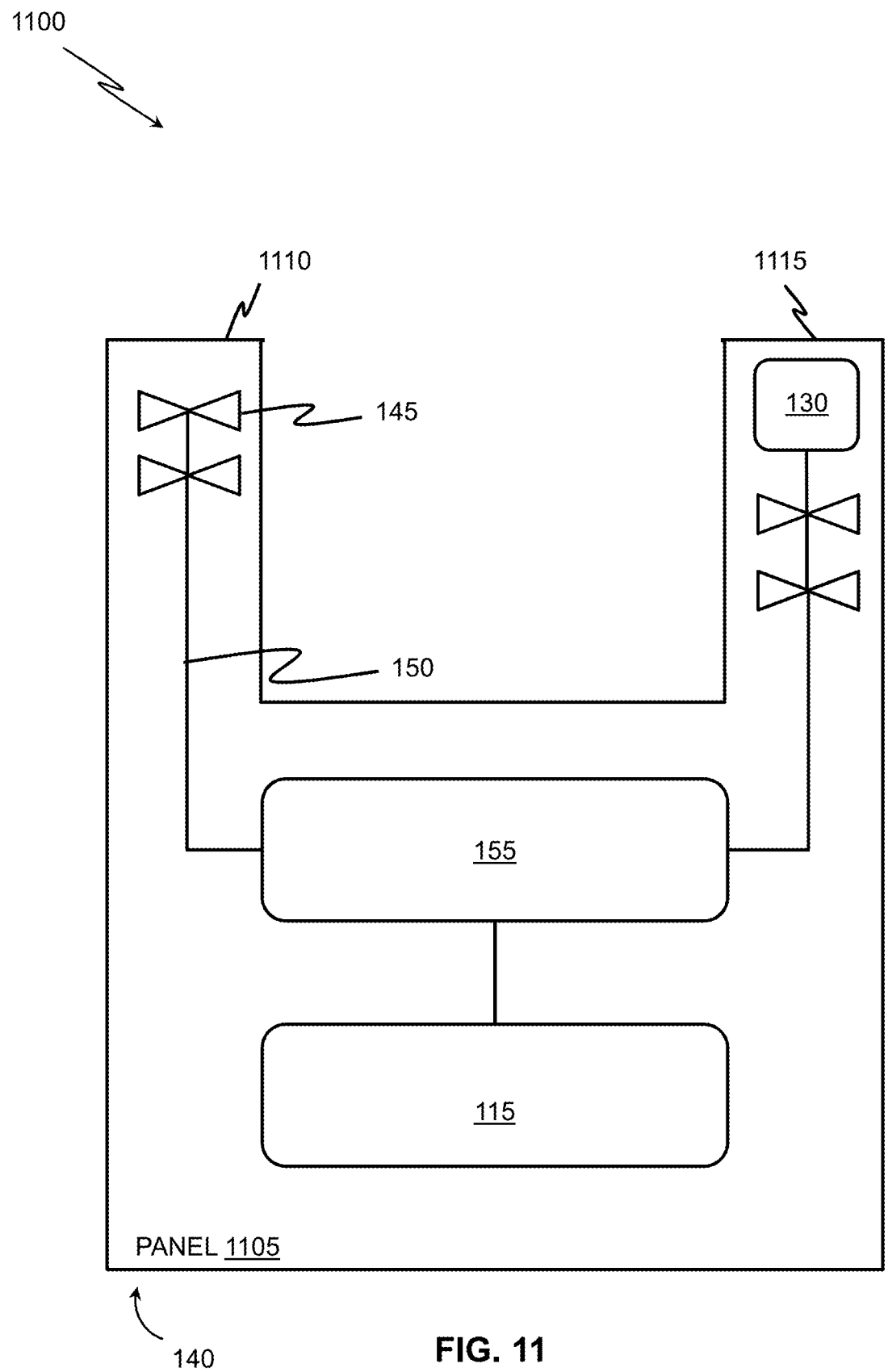
FIG. 11 depicts a front view of the communications node in the form of a backpack attachment, according to others embodiments.
Figure 12:
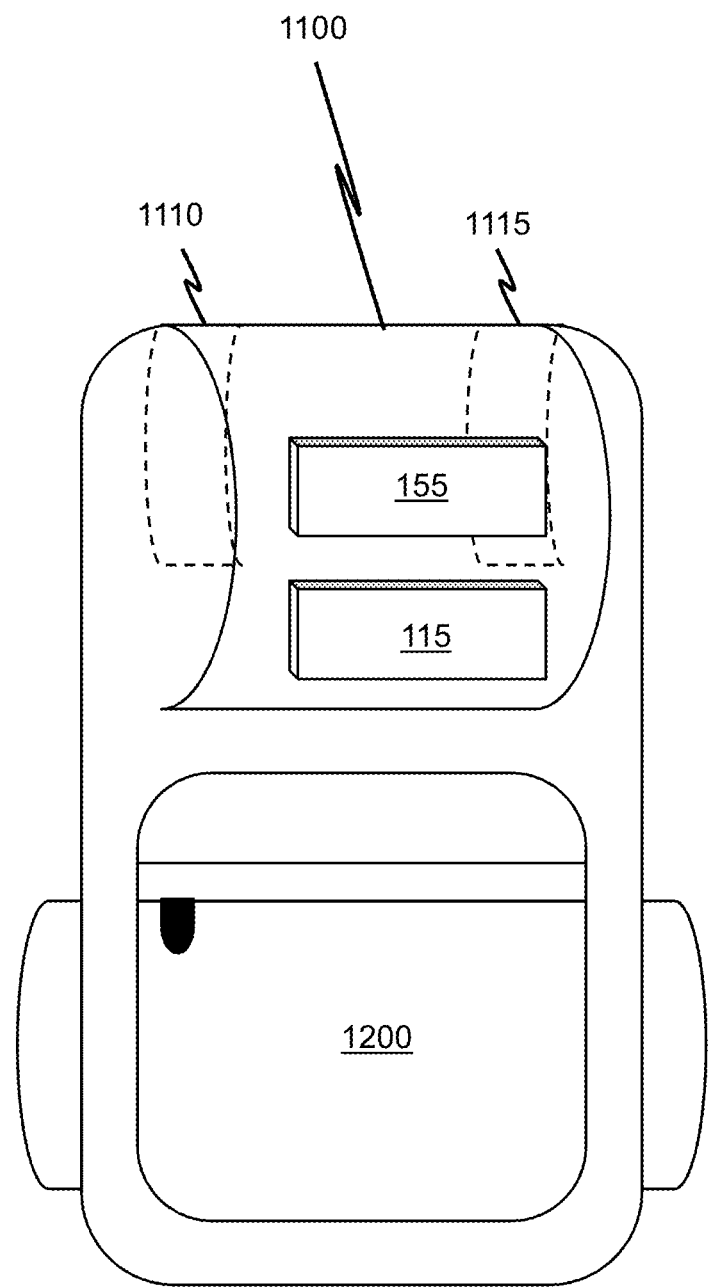
FIG. 12 depicts the backpack attachment coupled to a backpack, according to certain embodiments.

FIG. 11 depicts a wearable communications node 100 in the form of a backpack attachment ("attachment") 1100, in accordance with certain embodiments. The attachment 1100 is preferably configured to demountably attach to the top portion 1205 of a typical backpack (e.g., backpack 1200) known in the art, as depicted in FIG. 12. The backpack 1200 includes the top portion 1205, a bottom portion 1210, and shoulder straps 1215. The attachment preferably includes a panel 1105, a first arm 1110 that extends from the panel 1105, and a second arm 1115 that extends from the panel 1105 opposite the first arm 1110. The attachment 1100 further includes an A/V hub 130 coupled to the first arm 1110 or the second arm 1115. An antenna element 145 is positioned within the first arm 1110 or the second arm 1115. The battery 115 is positioned adjacent to the panel 1105. A communications device 110 is positioned within the panel 1105.

A control circuit 105 is communicatively coupled to the A/V hub 130, the antenna element 145, the communications device 110, and the battery 115. The apparel item 140 is configured to demountably couple to a backpack (e.g., backpack 1200) via the panel 1105, the first arm 1110, and the second arm 1115. The first arm 1110 and the second arm 1115 can each demountably couple to one of the shoulder straps 1215. The A/V hub 130 includes a microphone 160. The control circuit 105 is configured to establish, via the communications device 135, a self-organizing local area network ("LAN"; e.g., the network 300) with a plurality of computing devices (e.g., communications nodes 100), each of the computing devices is connected directly, dynamically, and non-hierarchically to the LAN. The control circuit 105 is also configured to communicate, via the communications device 135, with one or more of the computing devices (e.g., the communications nodes 100) using the self-organizing LAN (e.g., the network 300).

Figure 13:
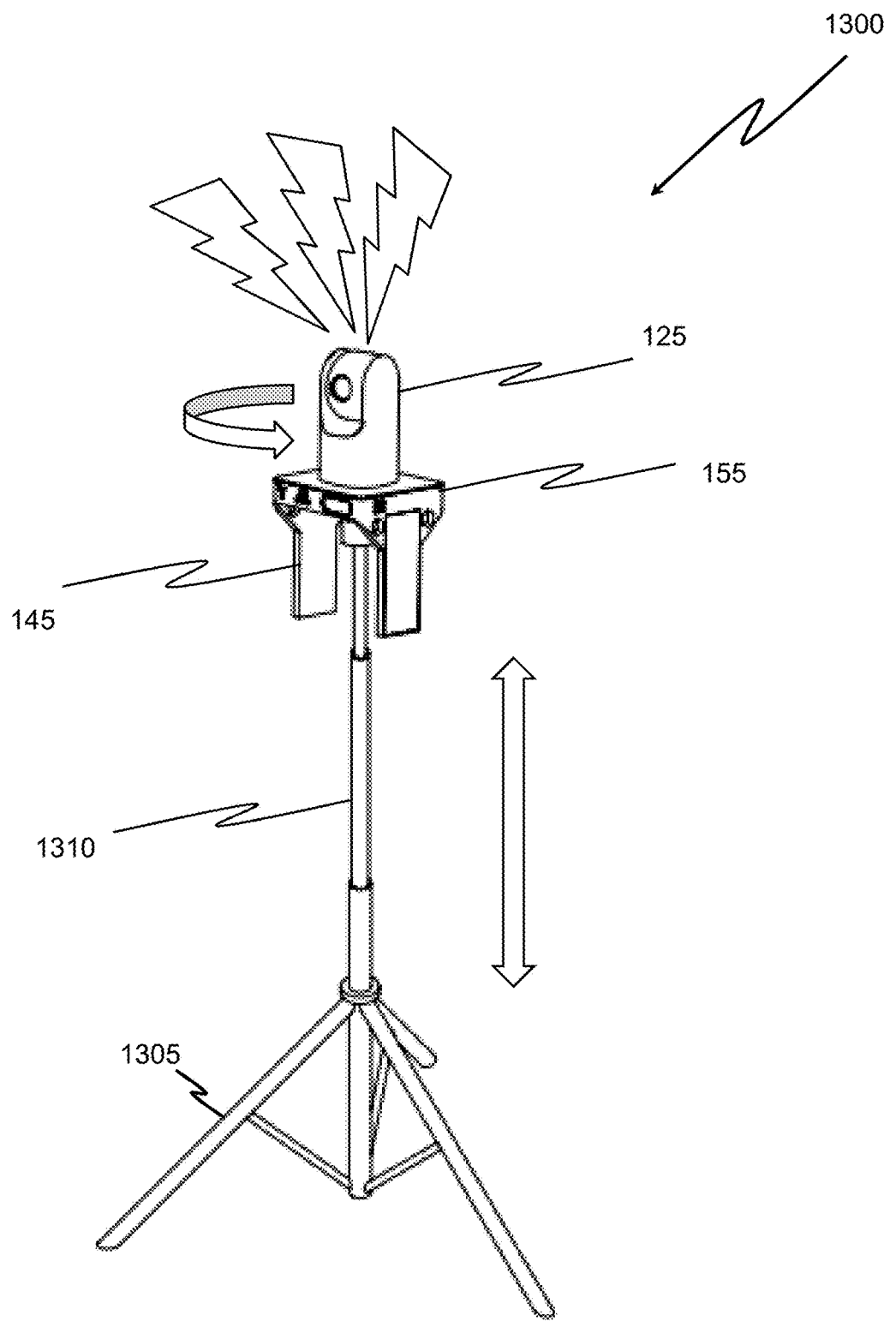
FIG. 13 depicts the communications node in the form of a drop node, according to yet still others embodiments.

FIG. 13 depicts the communications node 100 in the form of a drop node 1300, in accordance with some embodiments. For example, the drop node 1300 can include the same components and function in a similar manner to other communications nodes 100. The drop node 1300 does not include fabric material (e.g., the multilayered material 400). The drop node 1300 includes the housing 155 coupled to a camera 125 and antenna elements 145. The drop node 1300 is preferably affixed to rod 1310. The rod 1310 is preferably height/length adjustable and allows the height of the housing 155 to be adjusted up and down. In certain embodiments, the rod 1310 has a static height/length. The rod 1310 is also affixed to stand 1305, which is a multi-legged structure. Although FIG. 13 depicts the rod 1310 and the stand 1305 as a height adjustable tripod, other configurations are possible without deviating from the theme of this disclosure.

Figure 14:
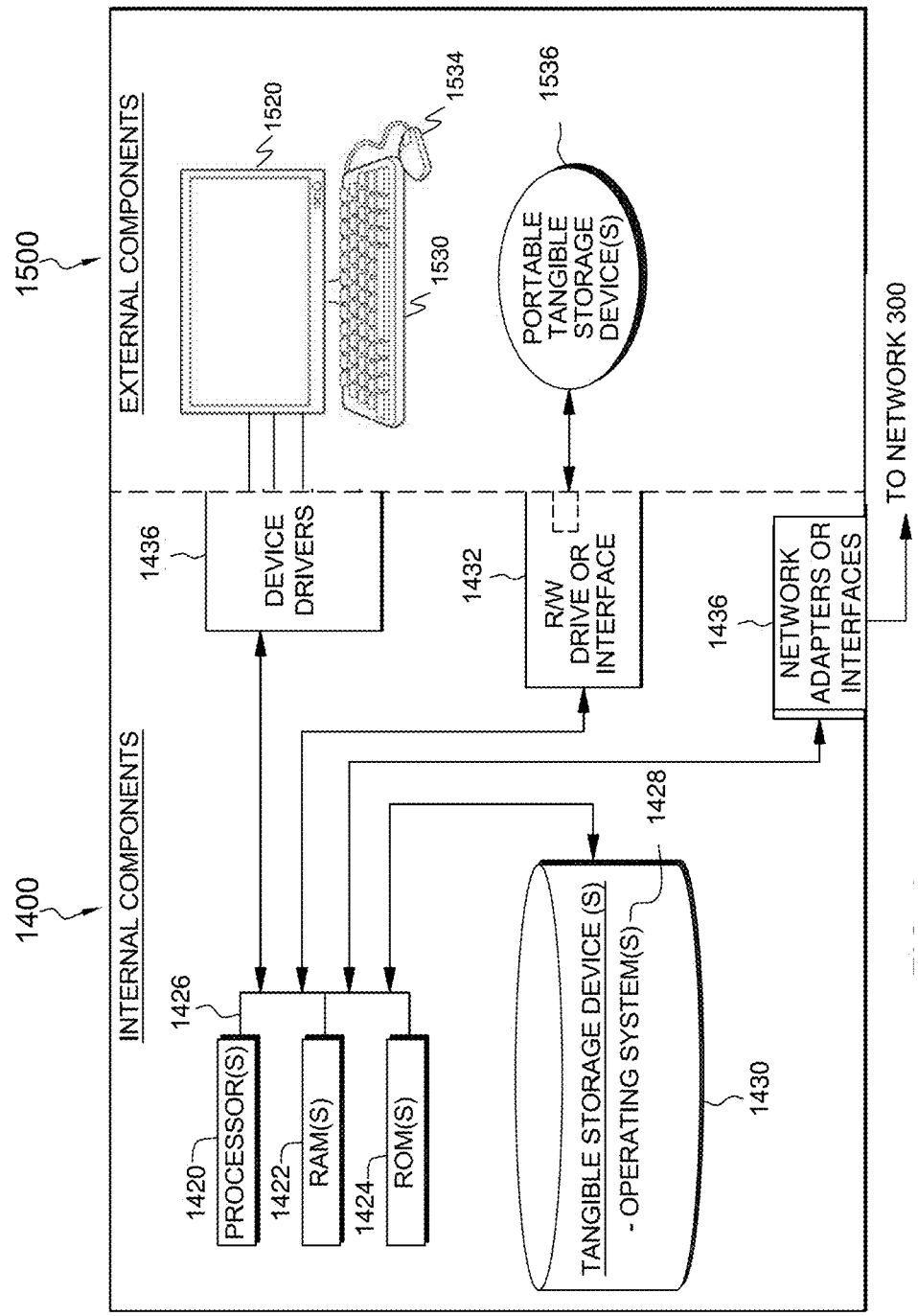
FIG. 14 depicts a block diagram of components of a communications node, according to some embodiments.

FIG. 14 depicts a block diagram of components of communications node 100, in accordance with an embodiment of the present invention. Data processing system 1400, 1500 is representative of any electronic device capable of executing machine-readable program instructions. Data processing system 1400, 1500 may be representative of a smart phone, a computer system, PDA, or other electronic devices. Examples of computing systems, environments, and/or configurations that may represented by data processing system 1400, 1500 include, but are not limited to, personal computer systems, server computer systems, thin clients, thick clients, wearable computer, hand-held or laptop devices, multiprocessor systems, microprocessor-based systems, network PCs, minicomputer systems, and distributed cloud computing environments that include any of the above systems or devices.

The communications node 100 includes respective sets of internal components 1400 and external components 1500 as illustrated in FIG. 14. Each of the sets of internal components 1400 includes one or more processors 1420, one or more computer-readable RAMs 1422 and one or more computer-readable ROMs 1424 on one or more buses 1426, and one or more operating systems 1428 and one or more computer-readable tangible storage devices 1430. Data files 170 are stored on one or more of the respective computer-readable tangible storage devices 1430 for execution by one or more of processors 1420 via one or more of the respective RAMs 1422 (which typically include cache memory). In the embodiment illustrated in FIG. 14, each of the computer-readable tangible storage devices 1430 is a magnetic disk storage device of an internal hard drive. Alternatively, each of the computer-readable tangible storage devices 1430 is a semiconductor storage device, such as ROM 1424, EPROM, flash memory or any other computer-readable tangible storage device that can store a computer program and digital information.

Internal components 1400 also include a R/W drive or interface 1432 to read from and write to one or more portable computer-readable tangible storage devices 1536, such as a CD-ROM, DVD, memory stick, magnetic tape, magnetic disk, optical disk or semiconductor storage device. Data files 170 can be stored on one or more of the respective portable computer-readable tangible storage devices 1436, read via the respective R/W drive or interface 1432 and loaded into the respective computer-readable tangible storage devices 1430.

Each set of internal components 1400 also includes network adapters or interfaces 1536 such as a TCP/IP adapter cards, wireless Wi-Fi interface cards, or 3G or 4G wireless interface cards or other wired or wireless communication links. Data files 170 can be downloaded to communications node 100, respectively, from an external computer via a network (for example, the Internet, a local area network or other, wide area network) and respective network adapters or interfaces 1536. From the network adapters or interfaces 1536, data files 170 in communications node 100 is loaded into the respective computer-readable tangible storage devices 1530. The network may comprise copper wires, optical fibers, wireless transmission, routers, firewalls, switches, gateway computers and/or edge servers.

Each of the sets of external components 1500 can include a computer display monitor 1520, a keyboard 1530, and a computer mouse 1534. External components 1500 can also include touch screens, virtual keyboards, touch pads, pointing devices, and other human interface devices. Internal components 1400 also include device drivers 1436 to interface to computer display monitor 1520, keyboard 1530 and computer mouse 1534. The device drivers 1436, R/W drive or interface 1432 and network adapters or interfaces 1436 comprise hardware and software (stored in storage device 1430 and/or ROM 1424).

Figure 15:
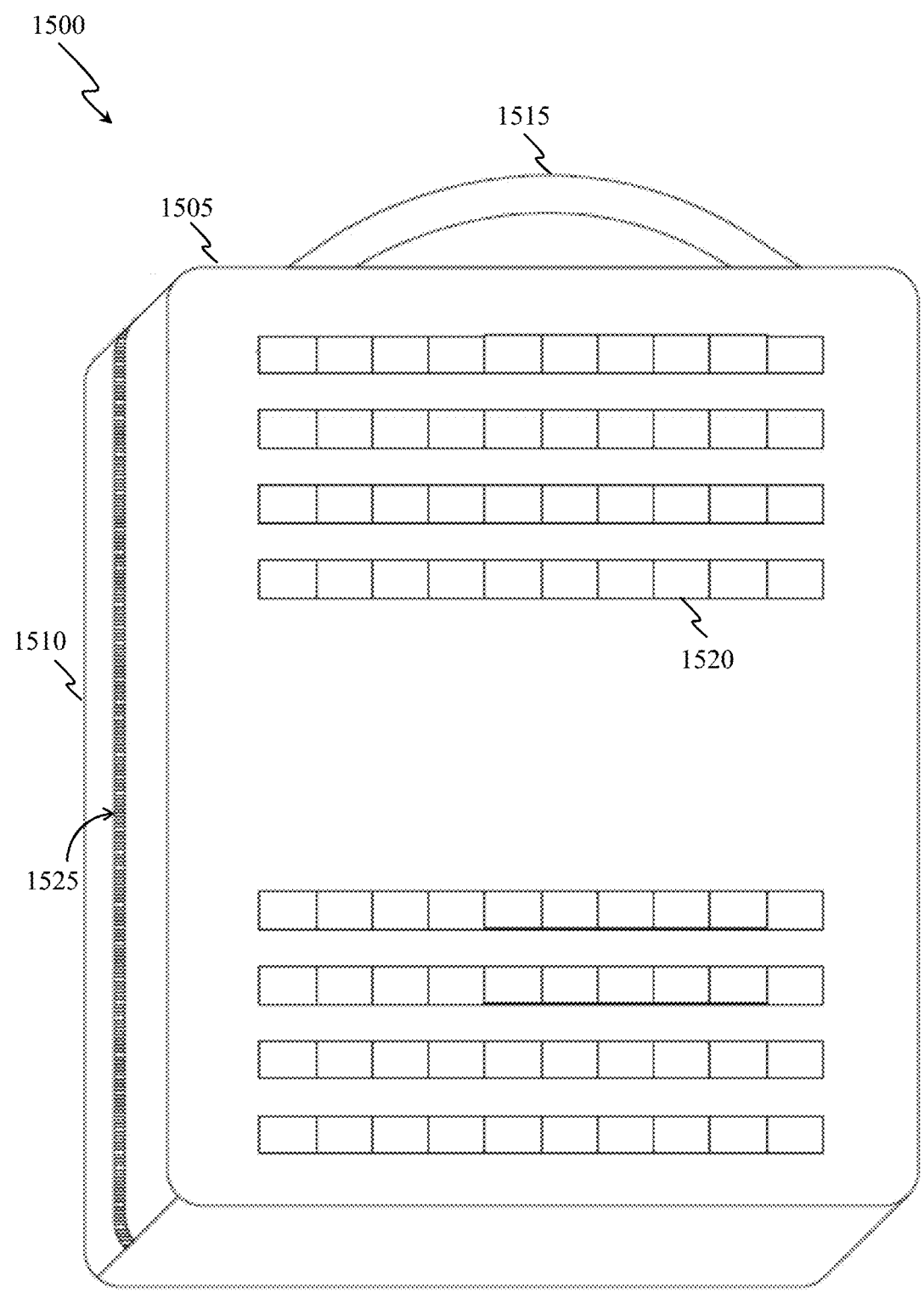
FIG. 15 depicts a front view of a shield in its "closed" state, according to others embodiments.
Figure 16:
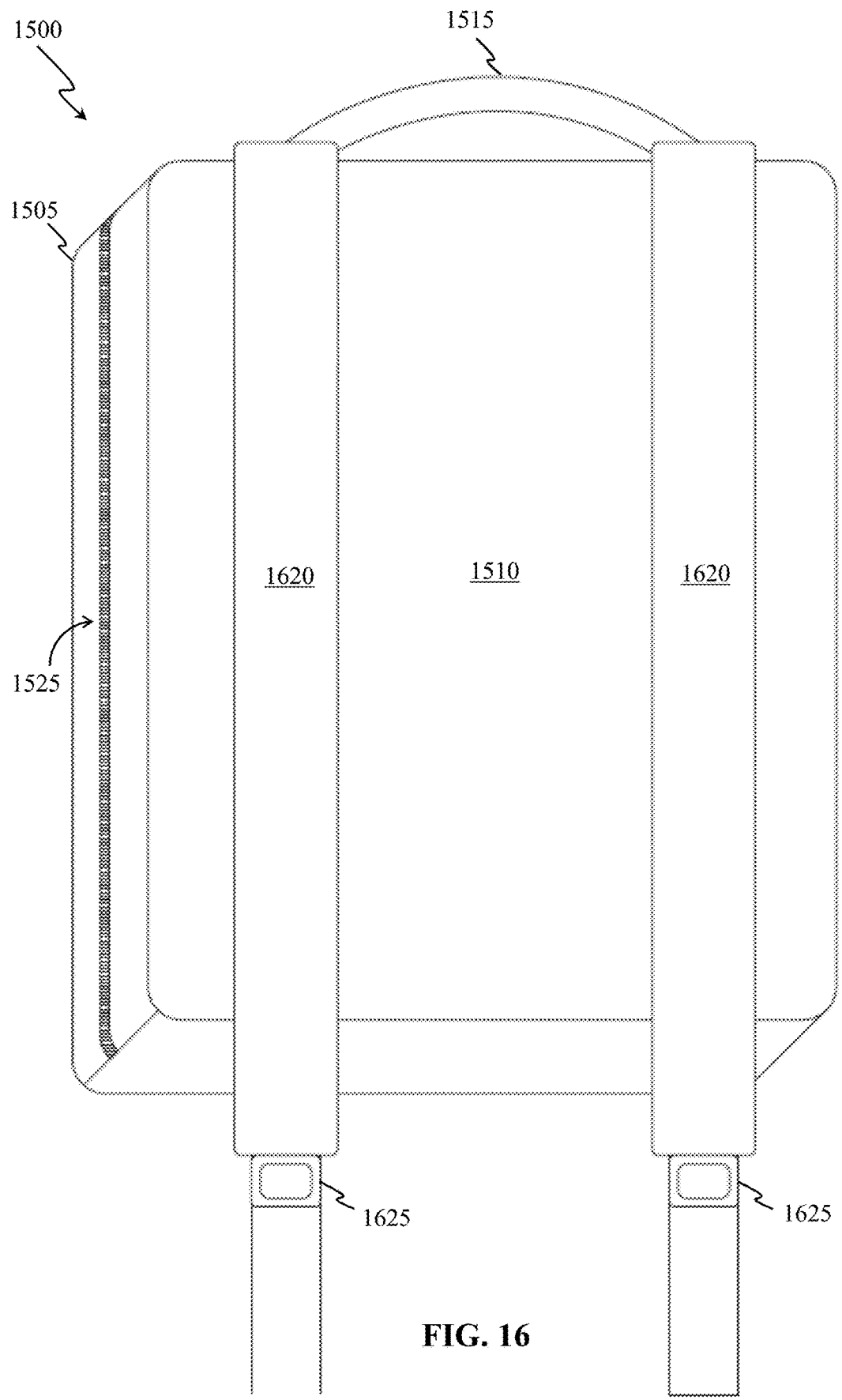
FIG. 16 depicts a back view of the shield in the "closed" state, according to certain embodiments.
Figure 17:
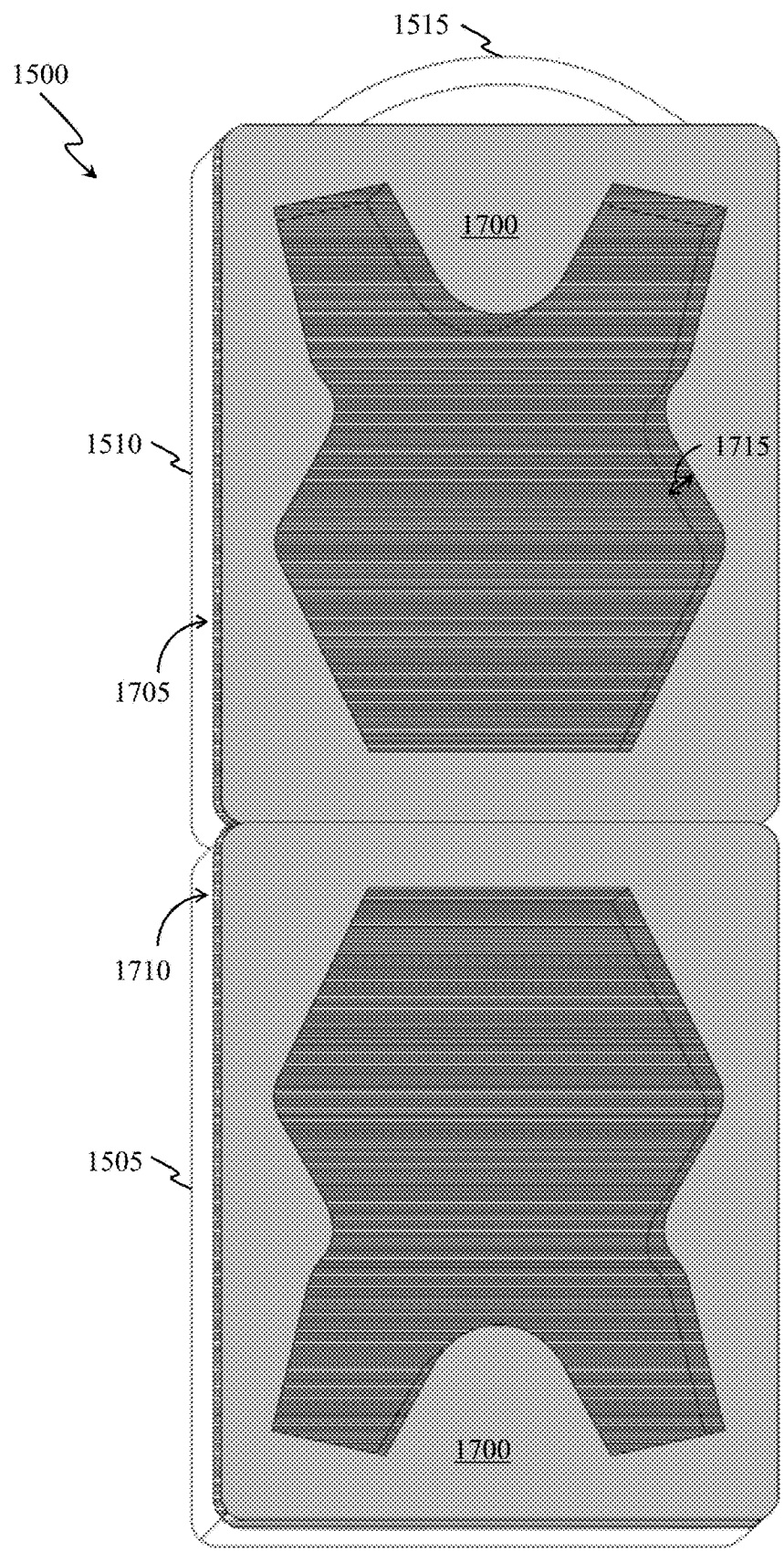
FIG. 17 depicts the shield in an "open" position, according to yet still others embodiments.

Referring now to FIGS. 15-17. The shield 1500 is a flexible container utilized to transport one or more of the communications nodes 100 (e.g., the node 500 or the node 700). FIGS. 15-17 illustrate a front perspective view, a rear perspective view, and a front view of the shield 1500 according to some embodiments. The shield 1500 is preferably a semi-rigid, open-faced, rectangular container having a "closed" state (e.g., as depicted in FIGS. 15-16) and an "open" state (e.g., as depicted in FIG. 17). The shield 100 includes a first portion 1505 pivotably coupled to a second portion 1510. In accordance with preferred embodiments, the shield 1500 is fire retardant and chemical resistance. Each of the first portion 1505 and second portion 1510 can each be made of a natural and/or synthetic textile (e.g., canvas). The first portion 1505 and/or the second portion 1510 can be made of the multilayered material 400. In some embodiments, the shield 1500 is coated with the composition.

In other embodiments, the first portion 1505 and the second portion 1510 each include synthetic material having fibers formed using the composition. For example, the fibers can be formed by extruding the composition through spinnerets thereby forming the fibers. The composition shows a low percolation threshold of 0.52 vol. %. EMI shielding effectiveness of the aforementioned coatings or fibers were tested over a frequency range of 8.2-12.4 GHz (i.e., X-band), and 21 dB shielding efficiency was obtained for 15 wt. % (8.8 vol. %) loading for the fully exfoliated graphene sheets, indicating that they may be used as lightweight, effective EMI shielding materials.

In preferred embodiments, the first portion 1510 and the second portion 1505 are each open-ended rectangular containers. A side lip 1705 of the first portion 1510 is affixed to a side lip 1710 of the second portion 1505 that thereby allows the first portion 1510 to pivot relative to the second portion 1505 and vise-versa. The first portion 1510 is demountably coupled to the second portion 1505 via a fastener 1525 (e.g., a zip fastener, zipper, or pressure track, or similar fasteners). The fastener 1525 is preferably a zipper to minimize the time required to transition between the "open" state and the "closed" state. Zipper use is also preferred because it enables the use of locking mechanisms to secure the shield 1500 against unwanted access. In other embodiments, the fastener 1525 provides EMI/RF shielding. For example, the fastener 1525 can be formed using the composition. In other embodiments, components of the fastener 1525 are coated with the composition. In certain embodiments, the lip 1705 overlaps with the lip 1710 to minimize/eliminate spacing between the first portion and the second portion in the "closed" state.

The preferred fastener (e.g., the zipper) preferably includes two rows of protruding teeth, which may be made to interdigitate, linking the rows, carrying from tens to hundreds of specially shaped metal or plastic teeth. These teeth can be either individual or shaped from a continuous coil, and are also referred to as elements. The slider, operated by hand, moves along the rows of teeth. Inside the slider is a Y-shaped channel that meshes together or separates the opposing rows of teeth, depending on the direction of the slider's movement. The fastener 1525 can further provide EMI shielding. The fastener 1525 demountably couples the open end of the first portion 1510 to open end of the second portion together.

The shield 100 also include a foam insert 1700 positioned within each of the first portion and second portions. In preferred embodiments, the foam insert 1700 includes polyurethane, melamine, polyethylene, similar polymer(s), or a combination of two or more thereof. Each foam insert 1700 provides impact resistance for the shield 1500 when placed therein. In other embodiments, the foam insert 1700 is coated with the composition to thereby provide EMI/RF shielding. In yet still other embodiments, the foam insert 1700 includes the composition. In other words, the composition can be utilized to generate the aforementioned foam. The shield 1500 preferably includes one or more handles 1515 affixed to a side thereof to assist in the transportation of the shield 1500. The second portion 1505 can include one or more rows of load-bearing attachment sites 1520 affixed to the external surface thereof. In some embodiments, the attachment sites 1520 are MOLLE-compatible. The first portion 1510 preferably includes one or more shoulder straps 1620 affixed thereto. For example, the shoulder straps 1620 may be adjustable (e.g., using fasteners 1625).

In other embodiments, the communications nodes 100 are autonomous aerial vehicles ("AAV"). Not to be limited by theory, radio frequency ("RF") interference continues to be a problem in urban environments, or areas with satellite farms, substations, et cetera. For example, signal reception inside buildings may be very weak for wireless communications. Users, for example warfighters and their first responder counterparts, typically depend on handheld radios to maintain small unit connectivity. These radios are lighter and less awkward than manpack systems, allowing more flexibility for users who must coordinate activities in adverse and chaotic situations. The disadvantage is that the range of handheld radios limits their effectiveness to areas with little or no infrastructure. RF signal repeaters ("repeaters") may solve this dilemma by extending the range of modern multiband digital handheld radios. The key advantage of a repeater system is that it greatly extends the range of handheld systems. It effectively transforms them into a manpack. This means that operators can operate effectively in environments that are not conducive to the bulk of manpack radios.

Legacy repeaters known in the art may operate on a fixed frequency, which means that their duplexers are tuned to a narrow frequency band to transmit and receive signals. Such restrictions can create difficulties, especially during joint expeditionary operations. Disclosed herein is an autonomous aerial communications system (hereinafter "ACS"). Specifically, the ACS includes one or more autonomous aerial vehicles ("AAV"). As used herein, the term "AAV" refers to an aircraft without a human pilot on board and a type of unmanned vehicle.

Figure 18:
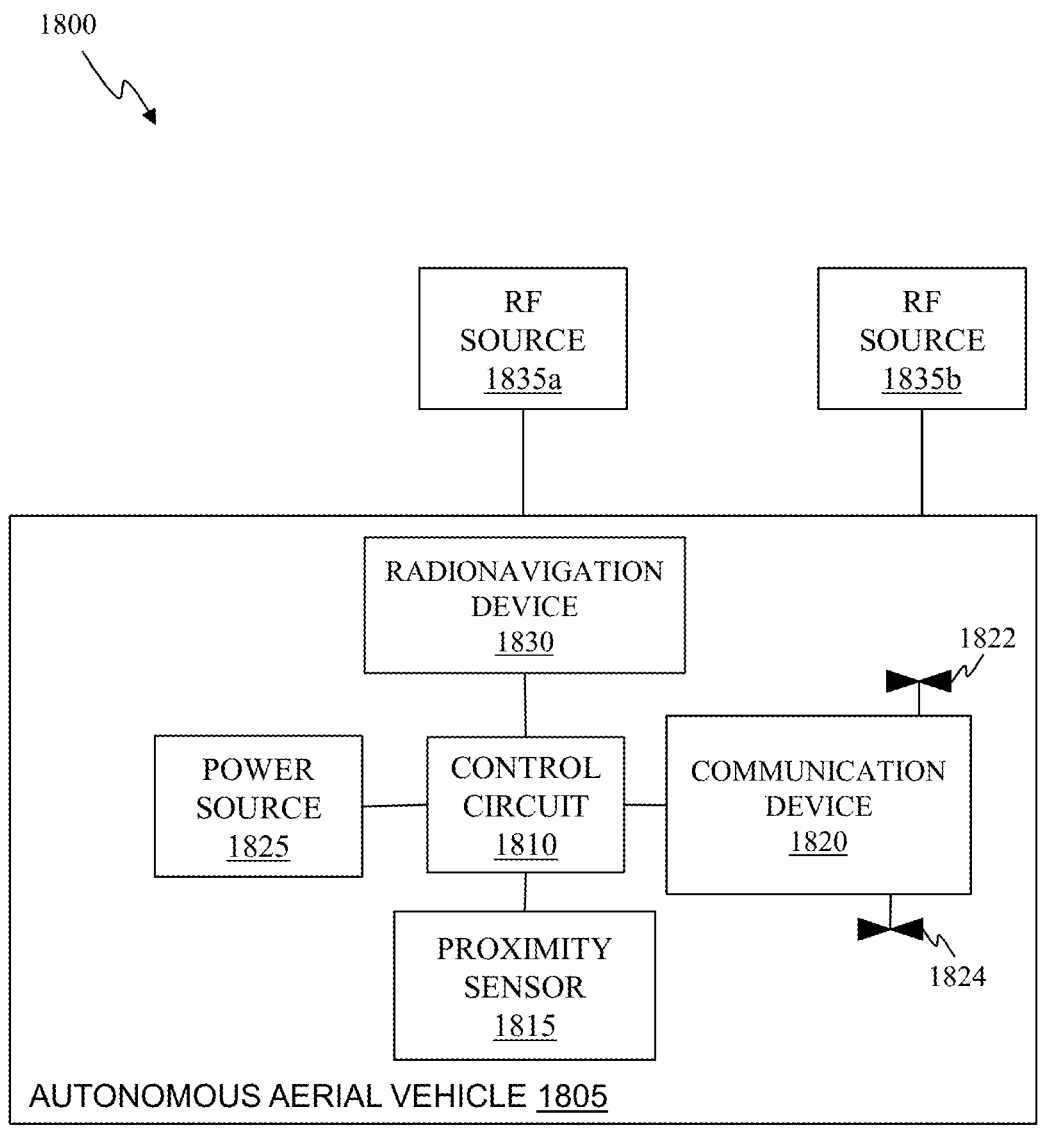
FIG. 18 depicts a block diagram illustrating a wireless communications environment involving an autonomous aerial vehicle ("AAV") and RF sources, according to certain embodiments.

FIG. 18 depicts a block diagram illustrating a wireless communications environment involving an AAV 1805 and a plurality of RF source 1835, according to some embodiments. The AAV 1805 preferably includes one or more of a proximity sensor 1815, a communications devices 1820, a power source 1825, and a radionavigation device 1830 interconnected via at least one control circuit 1810. The proximity sensor 1815 can include a proximity sensor known in the art.

Figure 19:
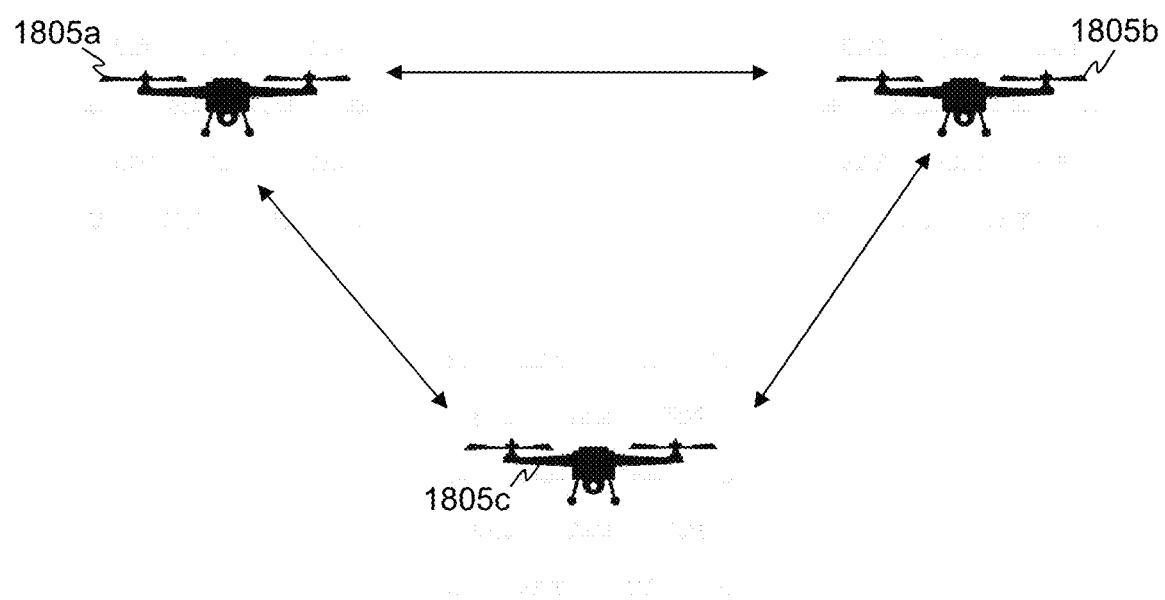
FIG. 19 illustrates a mesh network communications environment involving AAVs, according to some embodiments.

The radionavigation device 1830 (e.g., a Global Positioning System) allows the AAV 1805 to autonomously fly to preprogrammed points as well as determine how fast, high, and where to fly when paired with the one or more proximity sensors 1815. The communications device 1820 is an electronic device that receives a radiofrequency ("RF") signal (e.g., at a first baud rate) and retransmits it (e.g., at a second baud rate). The AAV 1805 uses the communications device 1820 to extend RF transmissions of mobile and/or stationary RF sources on handheld radios so that the signal can cover greater distances or be received on the other side of an obstruction. In addition, the AAV 1805 utilizes the communications device 1820 to communicate with other AAVs 1805, as depicted in FIG. 19.

For example, the communications device 1820 can repeat an identical signal, but alter its method of transmission (e.g., on another frequency or baud rate). The communications device 1820 preferably includes an RF receiver(s), a receiver antenna(s) 1822, a RF transmitter(s), and transmitter antennas 1824. In some embodiments, the communications device 1820 includes a duplexer that allows for the use of one antenna to receive and transmit at the same time.

In some embodiments, the flight of AAVs 1805 may operate with various degrees of autonomy, for example, either by remote control by a human operator or autonomously by onboard computers. Although various types of aerial vehicles are applicable herein, the AAV 1805 preferably is a multicopter (i.e., a rotorcraft with more than two rotors), for example, to take advantage of the flight stability and control.

For example, multicopters often use fixed-pitch blades, wherein control of vehicle motion is achieved by varying the relative speed of each rotor to change the thrust and torque produced by each. Applicable multicopters include, but are not limited to, tricopters, quadcopters, hexacopters, octocopters, etc. In certain embodiments, the multicopters can utilize coaxial rotors, in which each arm has two motors, running in opposite directions (one facing up and one facing down). The multicopters can include horizontal propellers. A radionavigation device 1830 allows the AAV 1805 to autonomously fly to preprogrammed points as well as determine how fast, high, and where to fly when paired with the proximity sensor(s) 1815.

Figure 20:
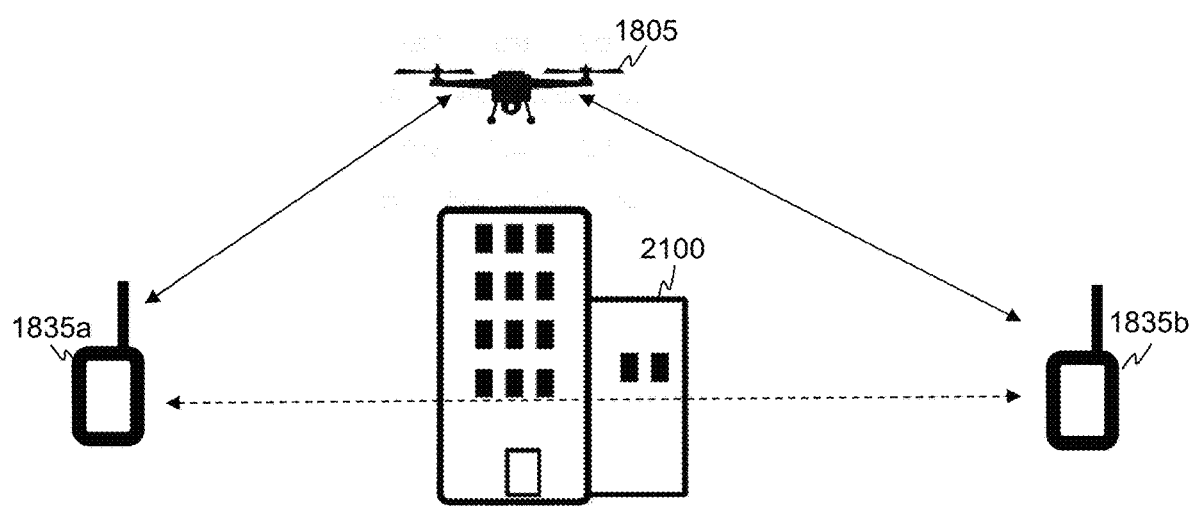
FIG. 20 illustrate an environment involving an AAV extending wireless communications around a building structure for RF sources, according to other embodiments.
Figure 21:
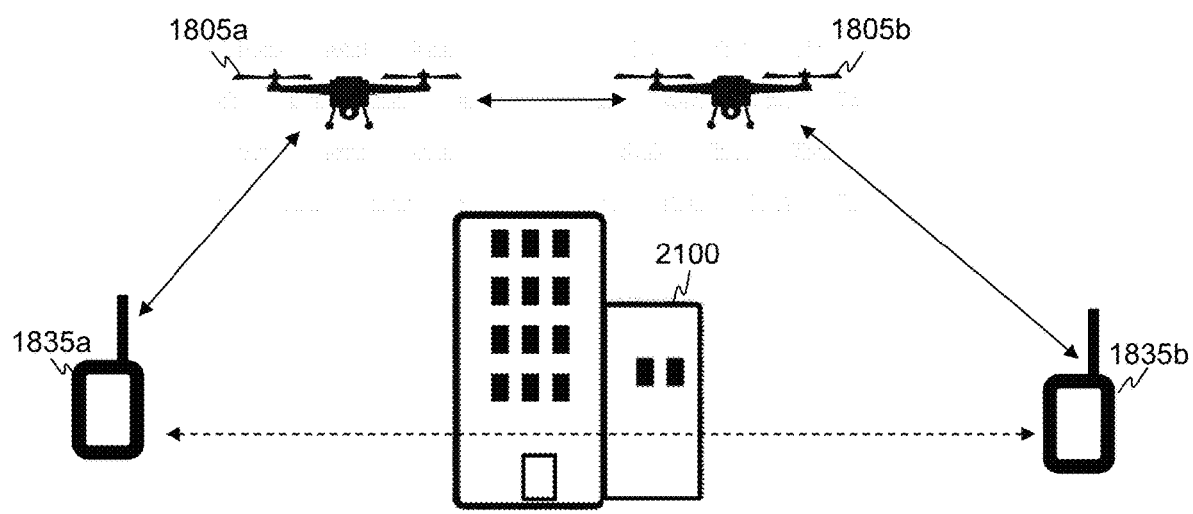
FIG. 21 illustrate AAVs extending wireless communications around a building structure for RF sources, according to other embodiments.
Figure 22:
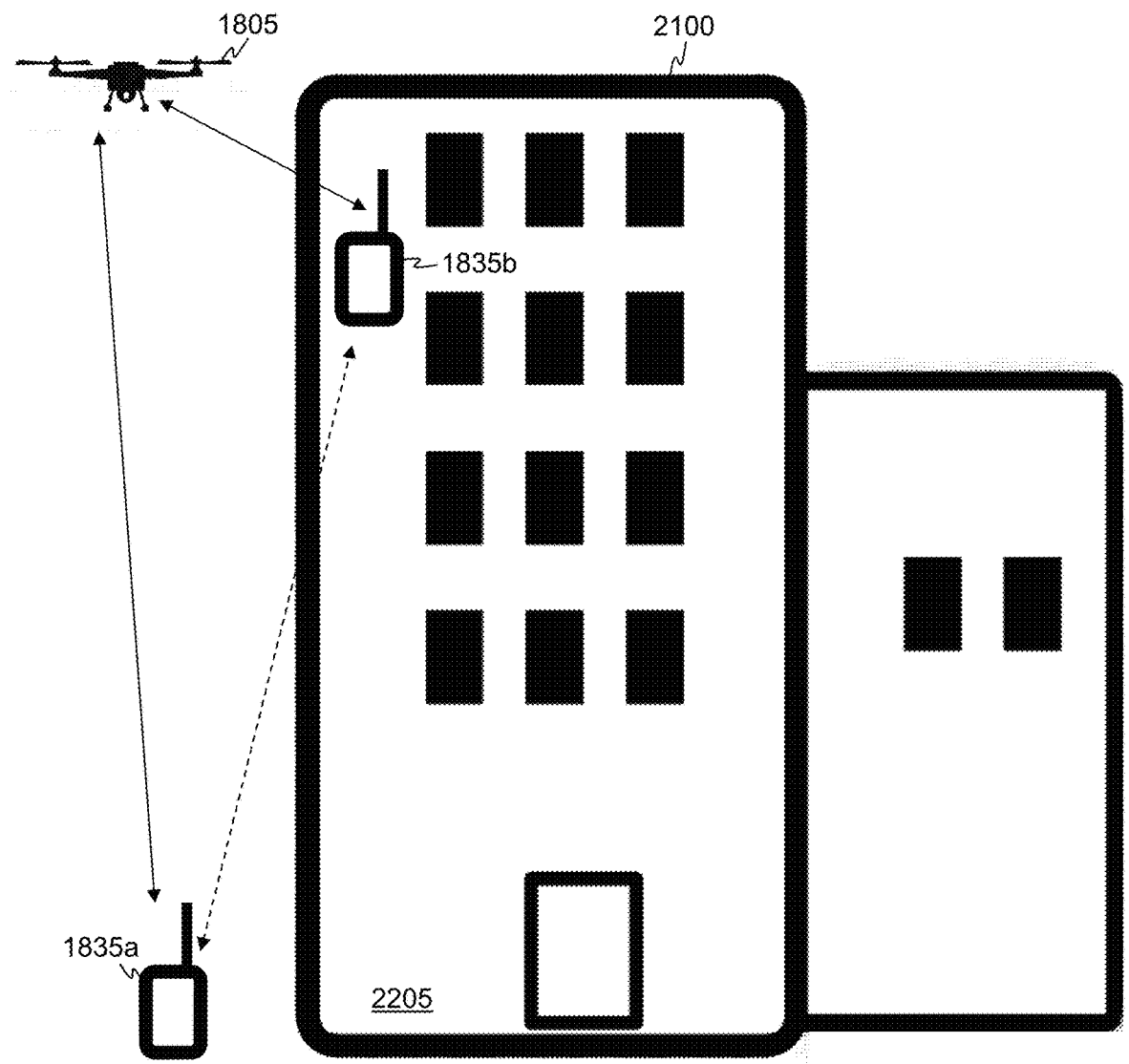
FIG. 22 illustrate an AAV extending wireless communications to allow RF sources to communicate through a building structure, according to certain embodiments.

Referring now to FIGS. 20-22, which illustrates a communication scheme, according to certain embodiments. As used herein, dotted lines reflect deteriorated or blocked communication links and solid lines reflect established communication links. Both warfighters and their first responder counterparts depend on handheld radios (i.e., mobile communications devices) to maintain small unit connectivity. The disadvantage is that the range of handheld radios limits their effectiveness in areas with little or no infrastructure. The AAV 1805 is configured to communicate with handheld radios (e.g., the RF source 1835) to extend the range thereof and allow users to counter/reduce the impact of RF interference in, for example, urban setting, within building structures (e.g., the building structure 2100), as well as similar environments rich in RF interference. Building structures, for example, typically function as RF obstructions that reduce the operating range of communication devices and thereby degrade communication between distant RF sources.

For example, the AAV 1805 can use the radionavigation device 1830, the communications device 1820, and the proximity sensor(s) 1815 to follow a user via identifying its RF signal and positioning itself to maintain, for example, a minimal signal-to-noise threshold value and a desired Fresnel zone. Not to be limited by theory, a plurality of AAVs 1805 can utilize a decentralized control algorithm to establish a self-organized collective. To be sure, the AAVs 1805 are autonomous and imperfect. That is, every AAV 1805 has (i) its own onboard computer for performing the calculations needed for controlling its own actions, (ii) its own sensor system for measuring relative positions and velocities, and (iii) its own communication device for data exchange with neighboring AAV 1805 and RF sources 1835 of interest (i.e., handheld radios, command centers, etc.).

The AAVs 1805 preferably work without central control. That is, although the AAVs 1805 can observe each other and may exchange information, they preferably do not send and receive direct control commands because there is no leader within the group, nor is there an external supervisor such as a base station or human overseer.

In this manner, the plurality of AAVs 1805 establishes an aerial mesh network that maintains a collective pattern (i.e., collision-free cohesive flocking pattern). To be sure, one or more AAVs 1805 may be utilized to establish/maintain communication linkage between handheld radios. As reflected in FIG. 22, RF communications links can be established between a RF source 1835*a* (e.g., a command base, another handheld radio, or similar devices) located outside a building structure 2100 (i.e., the RF obstruction) and one or more RF source 1835*b* (e.g., handheld radios) using one or more AAVs 1805 where each of the RF source's 1835*a* and 1835*b* has a direct communications link with an AAV 1805. Additional AAVs can be positioned between RF Sources A and B to maintain/establish the communications link as the signal-to-noise ratio deteriorates (i.e., drops below a minimum threshold value).

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, though the Internet using an Internet Service Provider).

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Based on the foregoing, a communications node has been disclosed in accordance with the present invention. However, numerous modifications and substitutions can be made without deviating from the scope of the present invention. Therefore, the present invention has been disclosed by way of example and not limitation. As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A wearable communications node, comprising:
 an apparel item in the form of a backpack attachment that comprises:
  a panel;
  a first arm extending from the panel;
  a second arm extending from the panel opposite the first arm;
 an antenna element affixed to the first arm or the second arm;
 an A/V hub affixed proximate to the first arm or the second arm;
 a communications device;
 a battery;
 a control circuit communicatively coupled to the antenna element, the A/V hub, the communications device, and the battery;
 wherein
  the backpack attachment is configured to demountably attach to a backpack via one or more of the panel, the first arm, and the second arm;
  the A/V hub
   is affixed to at least one of the first arm and second arm;
   demountably and communicatively couples to an audio/video source;
  the control circuit is configured to establish, via the communications device, a self-organizing local area network ("LAN") with a plurality of computing devices that each connects directly, dynamically, and non-hierarchically to the LAN;
  the antenna element comprises:
   a conductive composition comprising:
    fully exfoliated single sheets of graphene;
    a polymer;
   the fully exfoliated single sheets of graphene
    form a three-dimensional percolated network within the polymer; and
    are separated on a nanoscale within the polymer.

2. The wearable communications node of claim 1, wherein
 the apparel item further comprises a multilayered material; and
 the multilayered material comprises a layer that reflects RF radiation generated by the antenna element away from the apparel item.

3. The wearable communications node of claim 2, wherein
 the layer comprises a conductive material.

4. The wearable communications node of claim 3, wherein
 the layer comprises a foam.

5. The wearable communications node of claim 1, wherein
 the apparel item is hermetically sealed.

6. The wearable computing node of claim 1, wherein the A/V hub comprises a microphone.

7. The wearable computing node of claim 1, further comprising:
 a container comprising:
  a first portion;
  a second portion pivotably coupled to the first portion;
  an open state;
  a closed state;
 wherein
  the first portion and the second portion are each open-ended structures;
  in the open state
   the first portion is pivoted away from the second portion and thereby internally exposes the first portion and the second portion;
   the container receives the wearable communications node;
  in the closed state the first portion is pivoted towards and positioned on the second portion;
the first portion is demountably coupled to the second portion via a second fastener; and
the container surrounds the wearable communications node.

8. The wearable computing node of claim 7, wherein the container further comprises a foam insert that receives the wearable communications node;
the foam insert
provides impact resistance;
comprises the composition; and
shields the wearable communications node from EMI in the closed state.

9. The wearable computing node of claim 7, wherein one or more of the first portion and the second portion comprise the conductive composition and thereby provides EMI shielding.

10. The wearable computing node of claim 1, wherein the graphene sheets are present in the conductive composition at least at 0.52 vol. %.

11. The wearable computing node of claim 1, wherein
one of the computing devices is an autonomous aerial vehicle (AAV);
the AAV comprises a second communications device; and
the second communications device receives a RF signal from the wearable communications node at a first baud rate and transmit the RF signal at a second baud rate.

12. The wearable computing node of claim 1, wherein
the communications device is communicatively coupled to a second communications device;
an autonomous aerial vehicle (AAV) comprises the second communications device; and
the second communications device receives a RF signal from the communications device at a first baud rate and transmits the RF signal at a second baud rate.

13. A wearable communications node, comprising:
an apparel item in the form of a backpack attachment that comprises:
a panel;
a first arm extending from the panel;
a second arm extending from the panel opposite the first arm;
an antenna element affixed to the first arm or the second arm;
an A/V hub affixed to the first arm or the second arm, the A/V hub is configured to receive audio and/or video input;
a communications device;
a battery;
a control circuit communicatively coupled to the antenna element, the A/V hub, the communications device, and the battery;
wherein
the A/V hub
comprises a microphone;
demountably and communicatively couples to an audio/video source;
the control circuit is configured to establish, via the communications device, a self-organizing local area network ("WAN") with a plurality of computing devices that each connects directly, dynamically, and non-hierarchically to the WAN
the antenna element comprises:
a conductive composition comprising:
fully exfoliated single sheets of graphene;
a polymer;
the fully exfoliated single sheets of graphene
form a three-dimensional percolated network within the polymer; and
are separated on a nanoscale within the polymer.

14. The wearable communications node of claim 13, wherein
the apparel item further comprises a multilayered material;
the multilayered material comprises a layer that reflects RF radiation; and
the layer comprises a conductive material and a foam.

15. The wearable communications node of claim 13, wherein
the apparel item is hermetically sealed.

16. The wearable computing node of claim 13, further comprising:
a container comprising:
a first portion;
a second portion pivotably coupled to the first portion;
an open state;
a closed state;
a foam insert;
wherein
the first portion and the second portion are each open-ended structures;
in the open state
the first portion is pivoted away from the second portion and thereby internally exposes the first portion and the second portion;
the container receives the wearable computing node;
in the closed state
the first portion is pivoted towards and positioned on the second portion;
the first portion is demountably coupled to the second portion via a second fastener;
the container surrounds the wearable computing device;
the foam insert
provides impact resistance;
comprises the composition; and
shields the wearable computing device from EMI in the closed state.

17. The wearable computing node of claim 13, wherein the graphene sheets are present in the composition at least at 0.52 vol. %.

18. The wearable computing node of claim 13, wherein
one of the computing devices is an autonomous aerial vehicle (AAV);
the AAV comprises a second communications device; and
the second communications device receives a RF signal from the wearable communications node at a first baud rate and transmit the RF signal at a second baud rate.

19. The wearable computing node of claim 13, wherein
the communications device is communicatively coupled to a second communications device;
an autonomous aerial vehicle (AAV) comprises the second communications device; and
the second communications device receives a RF signal from the communications device at a first baud rate and transmits the RF signal at a second baud rate.

\* \* \* \* \*